US010457806B2

(12) United States Patent
Groote et al.

(10) Patent No.: US 10,457,806 B2
(45) Date of Patent: Oct. 29, 2019

(54) METHODS OF FORMING DYNAMIC CROSS-LINKED POLYMER COMPOSITIONS

(71) Applicant: SABIC Global Technologies B.V., Bergen op Zoom (NL)

(72) Inventors: Ramon Groote, Oisterwijk (NL); Chiel Albertus Leenders, Fijnaart (NL); Johannes Martinus Dina Goossens, Bergen op Zoom (NL); Robert Borst, Zevenbergen (NL); Tim Bernardus van Erp, Uden (NL); Bart Vandormael, Lummen (BE); Domenico La Camera, Breda (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/326,178

(22) PCT Filed: Jul. 16, 2015

(86) PCT No.: PCT/IB2015/055410
§ 371 (c)(1),
(2) Date: Jan. 13, 2017

(87) PCT Pub. No.: WO2016/009392
PCT Pub. Date: Jan. 21, 2016

(65) Prior Publication Data
US 2017/0218192 A1   Aug. 3, 2017

Related U.S. Application Data

(60) Provisional application No. 62/188,934, filed on Jul. 6, 2015, provisional application No. 62/026,458, filed on Jul. 18, 2014.

(51) Int. Cl.
| | |
|---|---|
| B29C 45/00 | (2006.01) |
| B29C 43/00 | (2006.01) |
| B29C 47/00 | (2006.01) |
| B29C 49/00 | (2006.01) |
| C08J 3/24 | (2006.01) |
| C08L 63/00 | (2006.01) |
| C08L 67/02 | (2006.01) |
| C08G 59/68 | (2006.01) |
| C08J 3/00 | (2006.01) |
| B29C 45/73 | (2006.01) |
| B29K 67/00 | (2006.01) |
| B29K 105/24 | (2006.01) |

(52) U.S. Cl.
CPC .............. *C08L 67/02* (2013.01); *C08G 59/68* (2013.01); *C08J 3/005* (2013.01); *C08J 3/24* (2013.01); *C08L 63/00* (2013.01); *B29C 45/0001* (2013.01); *B29C 45/73* (2013.01); *B29K 2067/006* (2013.01); *B29K 2105/24* (2013.01); *C08J 2367/02* (2013.01); *C08J 2463/02* (2013.01); *C08L 2312/00* (2013.01)

(58) Field of Classification Search
None
See application file for complete search history.

(56) References Cited

U.S. PATENT DOCUMENTS

| | | | |
|---|---|---|---|
| 4,087,479 A | 5/1978 | Toyota et al. | |
| 5,043,401 A * | 8/1991 | Matsuzaki | C08G 59/226 523/427 |
| 5,527,628 A | 6/1996 | Anderson et al. | |
| 5,994,462 A * | 11/1999 | Srinivasan | C08L 67/02 427/386 |
| 6,583,187 B1 * | 6/2003 | Daly | B01J 2/006 521/56 |
| 2002/0007035 A1 | 1/2002 | Nguyen et al. | |
| 2003/0194560 A1 * | 10/2003 | Spera | C08G 59/188 428/411.1 |
| 2005/0284920 A1 | 12/2005 | Martin et al. | |
| 2006/0043646 A1 | 3/2006 | Kobayashi et al. | |
| 2006/0141143 A1 | 6/2006 | McCollum et al. | |
| 2006/0205891 A1 | 9/2006 | Tanaka et al. | |
| 2007/0004871 A1 | 1/2007 | Lu et al. | |
| 2007/0085203 A1 | 4/2007 | Kariya et al. | |
| 2011/0319524 A1 | 12/2011 | Liebler et al. | |
| 2012/0231283 A1 | 9/2012 | Buijsen et al. | |
| 2017/0173847 A1 | 6/2017 | Groote et al. | |
| 2018/0009912 A1 | 1/2018 | Duquenne et al. | |
| 2018/0118875 A1 * | 5/2018 | Leenders | B29C 65/4815 |
| 2018/0118899 A1 * | 5/2018 | Ramakrishnan | C08J 3/24 |
| 2018/0201777 A1 * | 7/2018 | Leenders | C08L 67/02 |
| 2018/0208711 A1 | 7/2018 | Borst et al. | |

FOREIGN PATENT DOCUMENTS

| | | |
|---|---|---|
| CN | 1927989 A | 3/2007 |
| CN | 1957450 A | 5/2007 |
| CN | 102905877 A | 1/2013 |
| CN | 102906836 A | 1/2013 |
| CN | 106795274 A | 5/2017 |
| WO | 2012152859 A1 | 11/2012 |

(Continued)

OTHER PUBLICATIONS

D. Montarnal et al., Silica-Like Malleable Materials From Permanent Organic Networks, Science 334 (2011) 965-968.

(Continued)

*Primary Examiner* — Michael J Feely
(74) *Attorney, Agent, or Firm* — BakerHostetler

(57) ABSTRACT

Methods for preparing pre-dynamic cross-linked polymer compositions are described. Methods of preparing dynamic cross-linked polymer compositions using pre-dynamic cross-linked polymer compositions are also described.

26 Claims, 10 Drawing Sheets

(56) References Cited

FOREIGN PATENT DOCUMENTS

| WO | 2014086974 A1 | 6/2014 | |
| WO | WO-2014096716 A1 * | 6/2014 | ............ C08F 4/461 |

OTHER PUBLICATIONS

J.P. Brutman et al., Polylactide Vitrimers, ACS Macro Letters, 2014, 3, 607-610.

* cited by examiner

METHODS OF FORMING DYNAMIC CROSS-LINKED POLYMER COMPOSITIONS

CROSS-REFERENCE TO RELATED APPLICATIONS

This application is the National Stage of International Application No. PCT/IB2015/055410, filed Jul. 16, 2015, which claims the benefit of U.S. Provisional Application No. 62/026,458, filed Jul. 18, 2014, and U.S. Provisional Application No. 62/188,934, filed Jul. 6, 2015, the disclosures of which are incorporated herein by reference in their entireties.

BACKGROUND

Described herein are pre-dynamic and dynamic cross-linked polymer compositions, and in particular, to methods of making pre-dynamic and dynamic cross-linked polymer compositions.

Previously-described methods of making a dynamic cross-linked polymer composition by combining epoxides and carboxylic acids in the presence of a transesterification catalyst required feeding all components of the polymer into a vessel which was then heated to the processing temperature of the polymer. Once all the starting components were molten, the blend was mixed. During mixing, the cross-linking reaction would take place, which led to an increase in viscosity. While this method is suitable for some small-scale operations, it is cumbersome for larger scales due to difficulties in cleaning the reaction vessels and the stirring implements. In addition, this method does not readily allow for the production of pellets or other forms of material that can be re-worked, for example, by injection molding or profile extrusion.

There accordingly remains a need in the art for methods of making dynamic cross-linked polymer compositions that can be performed on larger scales and that enable pellet formation. It would be a further advantage if dynamic cross-linked polymer compositions could be used in injection molding, profile extrusion processes, and other processes.

SUMMARY

The above-described and other deficiencies of the art are met by methods of combining an epoxy-containing component, a polyester component, and a catalyst to form pre-dynamic cross-linked polymer compositions. In another embodiment, methods of using the pre-dynamic cross-linked polymer compositions in injection molding processes are described. In yet another embodiment, methods of using the pre-dynamic cross-linked polymer compositions in compression molding processes, profile extrusion processes, or a blow molding processes are described.

The above described and other features are exemplified by the following drawings, detailed description, examples, and claims.

BRIEF DESCRIPTION OF THE DRAWINGS

The following is a brief description of the drawings wherein like elements are numbered alike and which are exemplary of the various embodiments described herein.

DETAILED DESCRIPTION

Figure 1:
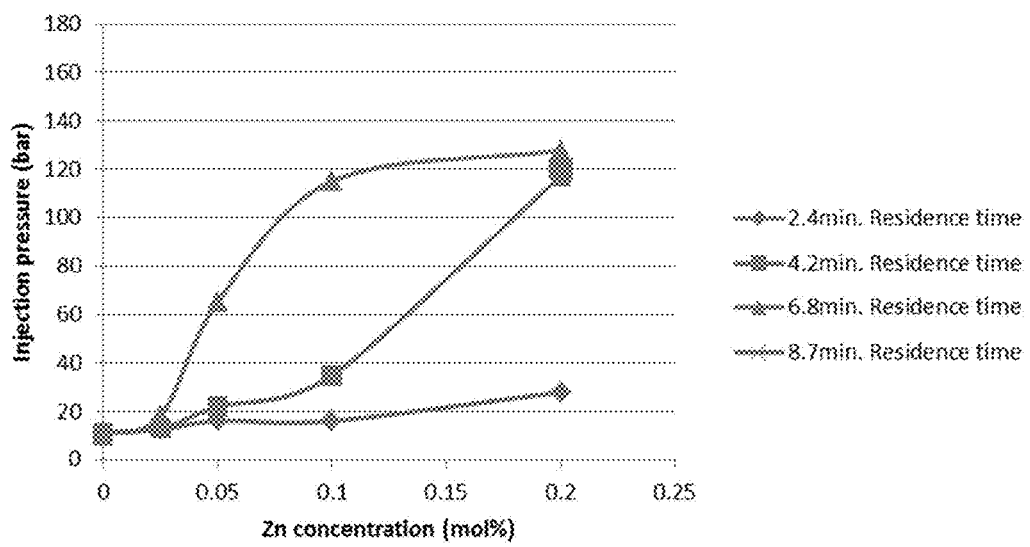
FIG. 1 depicts the effect of residence time and transesterification catalyst concentration on injection pressure using preferred embodiments of Samples 1-5 of Table 1.

The present disclosure can be understood more readily by reference to the following detailed description of desired embodiments and the examples included therein. In the following specification and the claims that follow, reference will be made to a number of terms which have the following meanings.

"Dynamic cross-linked polymer compositions," also referred to as "dynamic cross-linked networks" or "DCNs," have dynamically, covalently cross-linked polymer networks. At low temperatures, dynamic cross-linked polymer compositions behave like classic thermosets, but at elevated temperatures, it is believed that the cross-links undergo bond exchange reactions, e.g., transesterification reactions. At those elevated temperatures, the transesterification happens at such a rate that flow-like behavior is observed and the material can be processed.

Described herein are methods of making pre-dynamic cross-linked polymer compositions that can be converted to dynamic cross-linked polymer compositions upon exposure to sufficient heat. These pre-dynamic cross-linked polymer compositions are advantageous because they can be prepared more readily than dynamic cross-linked polymer compositions previously described in the art. The pre-dynamic cross-linked polymer compositions can also be processed into pellets, flakes, and the like that can be transported and further processed more readily than dynamic cross-linked polymer compositions known in the art.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. The materials, methods, and examples disclosed herein are illustrative only and not intended to be limiting.

The singular forms "a," "an," and "the" include plural referents unless the context clearly dictates otherwise. "Or" means "and/or." As used in the specification and in the claims, the term "comprising" can include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

Numerical values in the specification and claims of this application, particularly as they relate to polymers or polymer compositions, reflect average values for a composition that can contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language can be applied to modify any quantitative representation that can vary without resulting in a change in the basic function to which it is related. Accordingly, a value modified by a term or terms, such as "about" and "substantially," may not be limited to the precise value specified, in some cases. In at least some instances, the approximating language can correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" can refer to plus or minus 10% of the indicated number. For example, "about 10%" can indicate a range of 9% to 11%, and "about 1" can mean from 0.9-1.1. Other meanings of "about" can be apparent from the context, such as rounding off, so, for example "about 1" can also mean from 0.5 to 1.4.

As used herein, "Tm" refers to the melting temperature at which a polymer completely loses its orderly arrangement. As used herein, "Tc" refers to the crystallization temperature at which a polymer gives off heat to break a crystalline arrangement. The terms "glass transition temperature" or "Tg" refer to the maximum temperature at which a polymer will still have one or more useful properties. These properties include impact resistance, stiffness, strength, and shape retention. The Tg therefore can be an indicator of its useful upper temperature limit, particularly in plastics applications. The Tg can be measured using a differential scanning calorimetry method and expressed in degrees Celsius.

As used herein, "crosslink," and its variants, refer to the formation of a stable covalent bond between two polymers. This term is intended to encompass the formation of covalent bonds that result in network formation which in the current system, is preceded by chain extension. The term "cross-linkable" refers to the ability of a polymer to form such stable covalent bonds.

As used herein, "dynamic cross-linked polymer composition" refers to a class of polymer systems that include dynamically, covalently cross-linked polymer networks. At low temperatures, dynamic cross-linked polymer compositions behave like classic thermosets, but at higher temperatures, for example, temperatures up to about 320° C., it is theorized that the cross-links have dynamic mobility, resulting in a flow-like behavior that enables the composition to be processed and re-processed. Dynamic cross-linked polymer compositions incorporate covalently crosslinked networks that are able to change their topology through thermoactivated bond exchange reactions. The network is capable of reorganizing itself without altering the number of cross-links between its polymer chains. At high temperatures, dynamic cross-linked polymer compositions achieve transesterification rates that permit mobility between cross-links, so that the network behaves like a flexible rubber. At low temperatures, exchange reactions are very long and dynamic cross-linked polymer compositions behave like classical thermosets. The transition from the liquid to the solid is reversible and exhibits a glass. Put another way, dynamic cross-linked polymer compositions can be heated to temperatures such that they become liquid without suffering destruction or degradation of their structure. The viscosity of these materials varies slowly over a broad temperature range, with behavior that approaches the Arrhenius law. Because of the presence of the crosslinks, a dynamic cross-linked polymer composition will not lose integrity above the glass transition temperature (Tg) or the melting temperature (Tm) like a thermoplastic resin will. Dynamic cross-linked polymer compositions of the invention can have Tg of about 40 to about 60° C. An article made from a dynamic cross-linked polymer composition can be heated and deformed, and upon returning to the original temperature, maintains the deformed shape. This combination of properties permits the manufacture of shapes that are difficult or impossible to obtain by molding or for which making a mold would not be economical. Dynamic cross-linked polymer compositions generally have good mechanical strength at low temperatures, high chemical resistance, and low coefficient of thermal expansion, along with processability at high temperatures. Examples of dynamic cross-linked polymer compositions are described herein, as well as in U.S. Patent Application No. 2011/0319524, WO 2012/152859; WO 2014/086974; D. Montarnal et al., Science 334 (2011) 965-968; and J. P. Brutman et al, ACS Macro Lett. 2014, 3, 607-610.

As used herein, "pre-dynamic cross-linked polymer composition" refers to a mixture comprising all the required elements to form a dynamic cross-linked polymer composition, but which has not been cured sufficiently to establish the requisite level of cross-linking for forming a dynamic cross-linked polymer composition. Upon sufficient curing, for example, heating to temperatures up to about 320° C., a pre-dynamic cross-linked polymer composition will convert to a dynamic cross-linked polymer composition. Pre-dynamic cross-linked polymer compositions comprise an epoxy-containing component, a polyester component, and a transesterification catalyst, as well as optional additives.

Described herein are methods of forming pre-dynamic cross-linked polymer compositions, as well as pre-dynamic cross-linked polymer compositions formed according to the described methods. In these methods, an epoxy-containing component, a polyester component, and a catalyst, preferably a transesterification catalyst, are combined at temperatures of up to about 320° C. for about 15 minutes or less. The compositions formed as a result of that combination are "pre-dynamic cross-linked polymer compositions."

In preferred embodiments, the combining of the epoxy-containing component, the polyester component, and the catalyst occurs for less than about 7 minutes. In other embodiments, the combining step occurs for less than about 6 minutes, less than about 5 minutes, less than about 4 minutes, less than about 3 minutes, less than about 2 minutes, or less than about 1 minute. In yet other embodiments, the combining step occurs for less than about 2.5 minutes. In still other embodiments, the combining step occurs for between about 10 seconds and about 2.5 minutes, preferably between about 10 seconds and about 45 seconds. In still other embodiments, the combining step occurs for between about 10 minutes and about 15 minutes.

In some embodiments, the combining step occurs at temperatures of up to about 300° C. or about 320° C. In yet other embodiments, the combining step occurs at temperatures of between about 40° C. and about 320° C., preferably between about 40° C. and about 280° C. In other embodiments, the combining step occurs at temperatures of between about 40° C. and about 290° C. In some embodiments, the combining step occurs at temperatures of between about 40° C. and about 280° C. In some embodiments, the combining step occurs at temperatures of between about 40° C. and about 270° C. In other embodiments, the combining step occurs at temperatures of between about 40° C. and about 260° C. In some embodiments, the combining step occurs at temperatures of between about 40° C. and about 250° C. or between about 40° C. and about 240° C. In yet other embodiments, the combining step occurs at temperatures of between about 70° C. and about 320° C., preferably between about 70° C. and about 300° C. In still other embodiments, the combining step occurs at temperatures of between about 70° C. and about 280° C., preferably between about 70° C. and about 270° C. In other embodiments, the combining step occurs at temperatures of between about 70° C. and about 240° C., preferably between about 70° C. and about 230° C. In yet other embodiments, the combining step occurs at temperatures of between about 190° C. and about 320° C., preferably between about 180° C. and about 300° C. In still other embodiments, the combining step occurs at temperatures of between about 190° C. and about 270° C. In other embodiments, the combining step occurs at temperatures of between about 190° C. and about 240° C.

The combining step can be achieved using any means known in the art, for example, mixing, including screw mixing, blending, stirring, shaking, and the like. A preferred method for combining the epoxy-containing component, the polyester component, and the catalyst is to use an extruder apparatus, for example, a single-screw or twin-screw extruding apparatus.

The methods described herein can be carried out under ambient atmospheric conditions, but it is preferred that the methods be carried out under an inert atmosphere, for example, a nitrogen atmosphere. Preferably, the methods are carried out under conditions that reduce the amount of moisture in the resulting pre-dynamic cross-linked polymer compositions described herein. For example, preferred pre-dynamic cross-linked polymer compositions described herein will have less than about 3.0 wt. %, less than about 2.5 wt. %, less than about 2.0 wt. %, less than about 1.5 wt. %, or less than about 1.0 wt. % of water (i.e., moisture), based on the weight of the pre-dynamic cross-linked polymer composition.

In some methods, the combination of the epoxy-containing component, the polyester component, and the catalyst can be carried out at atmospheric pressure. In other embodiments, the combining step can be carried out at a pressure that is less than atmospheric pressure. For example, in some embodiments, the combination of the epoxy-containing component, the polyester component, and the catalyst is carried out in a vacuum.

The pre-dynamic cross-linked polymer compositions can be formed into any shape known in the art. Such shapes can be convenient for transporting the pre-dynamic cross-linked polymer compositions described herein. Alternatively, the shapes can be useful in the further processing of the pre-dynamic cross-linked polymer compositions described herein into dynamic cross-linked polymer compositions and articles comprising them. For example, the pre-dynamic cross-linked polymer compositions can be formed into pellets. In other embodiments, the pre-dynamic cross-linked polymer compositions can be formed into flakes. In yet other embodiments, the pre-dynamic cross-linked polymer compositions can be formed into powders.

During processing, a pre-dynamic cross-linked composition can proceed through three phases before the dynamic cross-linked composition is formed. Stage $1(t_0-t_1)$ refers to the time before cross-linking occurs. The state includes consistent processing and high flow. A molded part formed during stage 1 using a pre-dynamic cross-linked composition requires curing below the melt temperature of the composition in order to form the cross-linked system. Stage 2 $(t_1-t_2)$ refers to the time to form cross-links Processing during stage 2 is varied and the composition exhibits increasing viscosity. A part formed during stage 2 is partially cross-linked and requires curing after processing to be fully cross-linked. Stage 3 (at $t>t_2$) refers to complete cross-linking of the part.

Generally, a pre-dynamic cross-linked polymer compositions can be transformed into a dynamic cross-linked polymer composition article using existing processing or shaping processes such as, for example, injection molding, compression molding, profile extrusion, blow molding, and the like, given that the residence times of the processes are in the order of the reaction times of the dynamic cross-linked polymer composition formation. For example, the pre-dynamic cross-linked polymer compositions prepared according to the described methods can be melted and then injected into an injection mold to form an injection-molded article. The injection-molding process can provide the cured article by mold heating to temperatures of up to about 320° C., followed by cooling to ambient temperature. In other methods, a pre-dynamic cross-linked polymer composition can be melted, subjected to compression molding processes to activate the cross-linking system to form a dynamic cross-linked polymer composition.

In the methods of the present disclosure, the pre-dynamic cross-linked polymer compositions can be processed using low temperature and short processing times to ensure a that the pre-dynamic cross-linked polymer does not undergo cross-linking during processing. For example, the pre-dynamic cross-linked polymer can remain not cross-linked following injection molding or blow molding, for example. A low processing temperature can refer to from about 40° C. to about 80° C. In one example, a low processing temperature can refer to an injection mold temperature of about 60° C. Processing times refer to the duration of time the composition is molded, for example, injection molded. A short processing time can be an injection molding cycle time of up to about 20 seconds. The combination of low temperature and short processing time can enable the pre-dynamic cross-linked polymer composition as a molded part to exhibit low in-molded stress, good aesthetics, and thin wall part processing. Upon heating of a pre-dynamic cross-linked polymer part prepared according to this method, the part can be heat treated to temperatures above Tg. Heating to just below the melt or deformation temperature activates the dynamic cross-link network, that is, cures the composition to a dynamic cross-linked polymer composition.

Alternatively, the pre-dynamic cross-linked polymer compositions described herein can be melted, subjected to compression molding processes, and then cured. In other embodiments, the pre-dynamic cross-linked polymer compositions described herein can be melted, subjected to profile extrusion processes, and then cured. In some embodiments, the pre-dynamic cross-linked polymer compositions described herein can be melted, subjected to blow molding processes, and then cured.

The viscosities of the polymer compositions described herein will vary, depending on the pressure, temperature, degree of cross-linking, and the like. For example, the pre-dynamic cross-linked polymer compositions of the disclosure will exhibit a viscosity of less than about 500 Pa-s, for example, about 100 Pa-s to about 500 Pa-s, for the duration of the residence time in the extruder. The pre-dynamic cross-linked polymer compositions will exhibit higher viscosities upon subjection of the compositions to further processing, as the degree of cross-linking increases. For example, the pre-dynamic cross-linked polymer compositions of the disclosure exhibit viscosities of between about 500 Pa-s and about 1500 Pa-s, during an injection molding process. In another example, the pre-dynamic cross-linked polymer compositions of the disclosure exhibit viscosities of between about 500 Pa-s and about 3000 Pa-s, during a compression molding process. Upon sufficient heating, the pre-dynamic cross-linked polymer compositions will achieve substantially cross-linking, thus converting the pre-dynamic cross-linked polymer compositions to dynamic cross-linked polymer compositions. Dynamic cross-linked polymer compositions exhibit viscosities of at least about 1500 Pa-s, preferably greater than about 3000 Pa-s.

The individual components of the pre-dynamic cross-linked polymer compositions are described in more detail below.

The epoxy-containing component can be a monomer, an oligomer, or a polymer. Generally, the epoxy-containing component has at least two epoxy groups, and can also include other functional groups as desired, for example, hydroxyl (—OH). Glycidyl epoxy resins are a particularly preferred epoxy-containing component. Exemplary glycidyl epoxy ether is bisphenol diglycidyl ether (BADGE), which can be considered a monomer, oligomer or polymer, and is shown below as Formula (A).

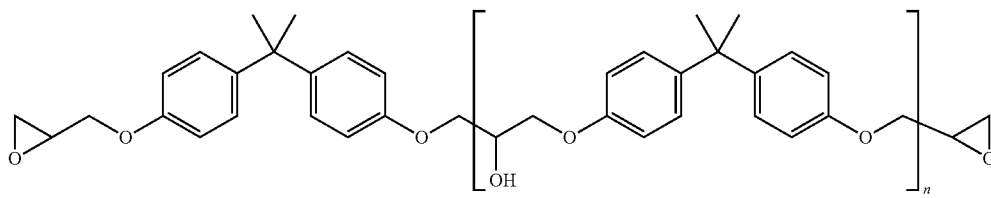

The value of n can be from 0 to about 25 in Formula (A). When n=0, this is a monomer. When n=1 to 7, this is an oligomer. When n=8 to about 25, this is a polymer. BADGE-based resins have excellent electrical properties, low shrinkage, good adhesion to numerous metals, good moisture resistance, good heat resistance and good resistance to mechanical impacts. BADGE oligomers (where n=1 or 2) are commercially available as D.E.R. 671 from Dow, which has an epoxide equivalent of 475-550 grams/equivalent, 7.8-9.4% epoxide, 1820-2110 mmol of epoxide/kilogram, a melt viscosity at 150° C. of 400-950 mPa·sec, and a softening point of 75-85° C.

Novolac resins can be used. These epoxy resins are obtained by reacting phenol with formaldehyde in the presence of an acid catalyst to produce a novolac phenolic resin, followed by a reaction with epichlorohydrin in the presence of sodium hydroxide as catalyst. Epoxy resins are illustrated as Formula (B):

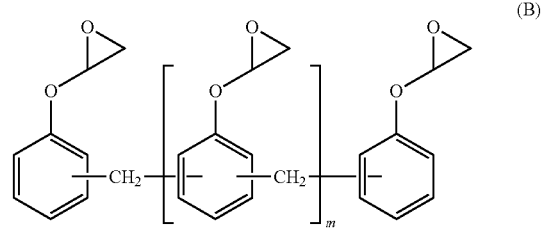

wherein m is a value from 0 to about 25.

Another useful epoxide is depicted in Formula (C).

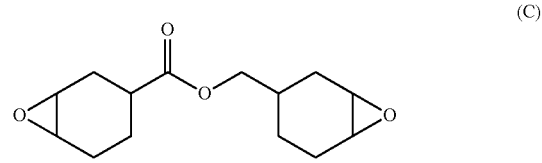 [SMILES: O=C(OCC1CCC2OC2C1)C1CCC2OC2C1]

Another useful epoxide is ARALDITE PT910, which is a mixture of bifunctional and trifunctional aromatic glycidyl esters depicted in Formulas (D10 and (D2).

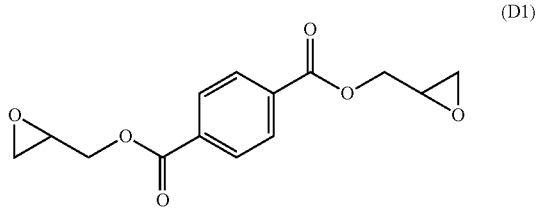
(D1)

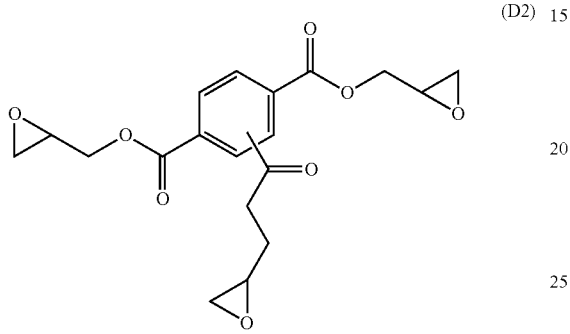
(D2)

Also present in the compositions described herein are polymers that have ester linkages, i.e., polyesters. "Polyesters" as used herein includes polymers that contain only ester linkages between monomers, and that can have the same or different ester units, as well as copolymers containing ester linkages between units and potentially other linkages (e.g., carbonate linkages) as well.

The polymer having ester linkages can be a polyalkylene terephthalate, for example, poly(butylene terephthalate), also known as PBT, which has the structure shown below:

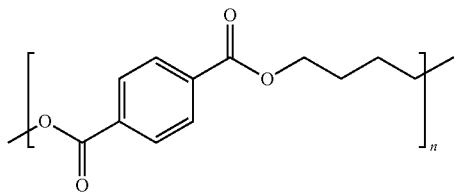

where n is the degree of polymerization, and can be as high as about 1,000, and the polymer can have a weight average molecular weight of up to about 100,000 Daltons.

The polymer having ester linkages can be, for example, poly(propylene terephthalate), also known at PPT, or poly(ethylene terephthalate), also known as PET. PET has the structure shown below:

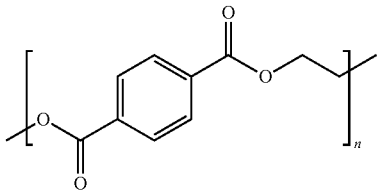

where n is the degree of polymerization, and can be as high as about 1,000, and the polymer can have a weight average molecular weight of up to about 100,000 Daltons.

The polymer having ester linkages can be PCTG, which refers to poly(cyclohexylenedimethylene terephthalate), glycol-modified. This is a copolymer formed from 1,4-cyclohexanedimethanol (CHDM), ethylene glycol, and terephthalic acid. The two diols react with the diacid to form copolyester. The resulting copolyester has the structure shown below:

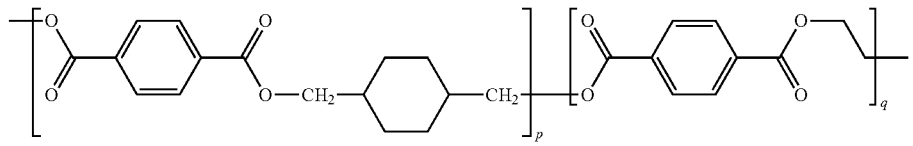

where p is the molar percentage of repeating units derived from CHDM, q is the molar percentage of repeating units derived from ethylene glycol, and p>q, and the polymer can have a weight average molecular weight of up to about 100,000 Daltons.

The polymer having ester linkages can also be PETG. PETG has the same structure as PCTG, except that the ethylene glycol is 50 mole % or more of the diol content. PETG is an abbreviation for polyethylene terephthalate, glycol-modified.

The polymer having ester linkages can be poly(1,4-cyclohexane-dimethanol-1,4-cyclohexanedicarboxylate), i.e. PCCD, which is a polyester formed from the reaction of CHDM with dimethyl cyclohexane-1,4-dicarboxylate. PCCD has the structure shown below:

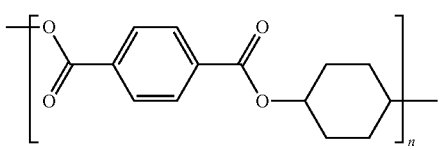

where n is the degree of polymerization, and can be as high as about 1,000, and the polymer can have a weight average molecular weight of up to about 100,000 Daltons.

The polymer having ester linkages can be poly(ethylene naphthalate), also known as PEN, which has the structure shown below:

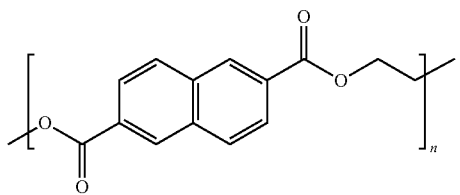

where n is the degree of polymerization, and can be as high as about 1,000, and the polymer can have a weight average molecular weight of up to about 100,000 Daltons.

The polymer having ester linkages can also be a copolyestercarbonate. A copolyestercarbonate contains two sets of repeating units, one having carbonate linkages and the other having ester linkages. This is illustrated in the structure below:

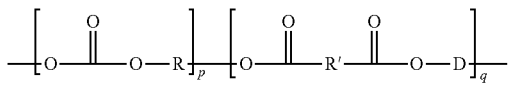

where p is the molar percentage of repeating units having carbonate linkages, q is the molar percentage of repeating units having ester linkages, and p+q=100%; and R, R', and D are independently divalent radicals.

The divalent radicals R, R' and D can be made from any combination of aliphatic or aromatic radicals, and can also contain other heteroatoms, such as for example oxygen, sulfur, or halogen. R and D are generally derived from dihydroxy compounds, such as the bisphenols of Formula (A). In particular embodiments, R is derived from bisphenol-A. R' is generally derived from a dicarboxylic acid. Exemplary dicarboxylic acids include isophthalic acid; terephthalic acid; 1,2-di(p-carboxyphenyl)ethane; 4,4'-dicarboxydiphenyl ether; 4,4'-bisbenzoic acid; 1,4-, 1,5-, or 2,6-naphthalenedicarboxylic acids; and cyclohexane dicarboxylic acid. As additional examples, the repeating unit having ester linkages can be butylene terephthalate, ethylene terephthalate, PCCD, or ethylene naphthalate as depicted above.

Aliphatic polyesters can also be used. Examples of aliphatic polyesters include polyesters having 1 or more, and up to about 1,000 repeating units of the following formula:

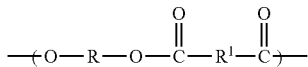

where at least one R or $R^1$ is an alkyl-containing radical. In some embodiments, at least one R or $R^1$ is a $C_{1-18}$ alkylene, and in preferred embodiments, at least one of the R1 is $C_{4-18}$ alkylene. These can be prepared from the polycondensation of glycol and an aliphatic dicarboxylic acid, in particular a $C_{4-18}$ alkylene dicarboxylic acid such as sebacic acid.

By using an equimolar ratio between the hydroxyl/epoxy groups of the epoxy-containing component and the ester groups of the polymer having ester linkages, a moderately crosslinked polyhydroxy ester network can be obtained. The following conditions are generally sufficient to obtain a three-dimensional network:

$N_A < N_O + 2N_X$ $N_A > N_X$ wherein $N_O$ denotes the number of moles of hydroxyl groups; $N_X$ denotes the number of moles of epoxy groups; and $N_A$ denotes the number of moles of ester groups.

The mole ratio of hydroxyl/epoxy groups (from the epoxy-containing component) to the ester groups (from the polymer having ester linkages) in the system is generally from about 1:100 to about 5:100.

Certain transesterification catalysts can be used to catalyze the reactions described herein. The transesterification catalyst is used in an amount up to about 25 mol %, for example, about 0.025 mol % to about 25 mol %, of the total molar amount of ester groups in the polyester component. In some embodiments, the transesterification catalyst is used in an amount of from about 0.025 mol % to about 10 mol % or from about 1 mol % to less than about 5 mol %. Preferred embodiments include about 0.025, about 0.05, about 0.1, about 0.2 mol % of catalyst, based on the number of ester groups in the polyester component. Alternatively, the catalyst is used in an amount of from about 0.1% to about 10% by mass relative to the total mass of the reaction mixture, and preferably from about 0.5% to about 5%.

Transesterification catalysts are known in the art and are usually chosen from metal salts, for example, acetylacetonates, of metals such as zinc, tin, magnesium, cobalt, calcium, titanium, and zirconium.

Tin compounds such as dibutyltin laurate, tin octanoate, dibutyltin oxide, dioctyltin, dibutyldimethoxytin, tetraphenyltin, tetrabutyl-2,3-dichlorodistannoxane, and all other stannoxanes are envisioned as suitable catalysts.

Rare earth salts of alkali metals and alkaline earth metals, particularly rare earth acetates, alkali metal and alkaline earth metals such as calcium acetate, zinc acetate, tin acetate, cobalt acetate, nickel acetate, lead acetate, lithium acetate, manganese acetate, sodium acetate, and cerium acetate are other catalysts that can be used.

Salts of saturated or unsaturated fatty acids and metals, alkali metals, alkaline earth and rare earth metals, for example zinc stearate, are also envisioned as suitable catalysts.

Other catalysts that can be used include metal oxides such as zinc oxide, antimony oxide, and indium oxide; metal alkoxides such as titanium tetrabutoxide, titanium propoxide, titanium isopropoxide, titanium ethoxide, zirconium alkoxides, niobium alkoxides, tantalum alkoxides; alkali metals; alkaline earth metals, rare earth alcoholates and metal hydroxides, for example sodium alcoholate, sodium methoxide, potassium alkoxide, and lithium alkoxide; sulfonic acids such as sulfuric acid, methane sulfonic acid, para-toluene sulfonic acid; phosphines such as triphenylphosphine, dimethylphenylphosphine, methyldiphenylphosphine, tri-t-butylphosphine; and phosphazenes.

The catalyst can also be an organic compound, such as benzyldimethylamide or benzyltrimethyl ammonium chloride. These catalysts are generally in solid form, and advantageously in the form of a finely divided powder. A preferred catalyst is zinc(II)acetylacetonate.

Suitable transesterification catalysts are also described in Otera, J. Chem. Rev. 1993, 93, 1449-1470. Tests for determining whether a catalyst will be appropriate for a given polymer system within the scope of the disclosure are described in, for example, U.S. Published Application No. 2011/0319524 and WO 2014/086974.

Other additives can be present in the compositions described herein, as desired. Exemplary additives include: one or more polymers, ultraviolet agents, ultraviolet stabilizers, heat stabilizers, antistatic agents, anti-microbial agents, anti-drip agents, radiation stabilizers, pigments, dyes, fibers, fillers, plasticizers, fibers, flame retardants, antioxidants, lubricants, wood, glass, metals, nucleating agents, clarifying agents, and combinations thereof.

Exemplary polymers that can be mixed with the compositions described herein include elastomers, thermoplastics, thermoplastic elastomers, and impact additives. The compositions described herein can be mixed with other polymers such as a polyester, a polyestercarbonate, a bisphenol-A homopolycarbonate, a polycarbonate copolymer, a tetrabromo-bisphenol A polycarbonate copolymer, a polysiloxane-co-bisphenol-A polycarbonate, a polyesteramide, a polyimide, a polyetherimide, a polyamideimide, a polyether, a polyethersulfone, a polyepoxide, a polylactide, a polylactic acid (PLA), an acrylic polymer, polyacrylonitrile, a polystyrene, a polyolefin, a polysiloxane, a polyurethane, a polyamide, a polyamideimide, a polysulfone, a polyphenylene ether, a polyphenylene sulfide, a polyether ketone, a polyether ether ketone, an acrylonitrile-butadiene-styrene (ABS) resin, an acrylic-styrene-acrylonitrile (ASA) resin, a polyphenylsulfone, a poly(alkenylaromatic) polymer, a polybutadiene, a polyacetal, a polycarbonate, an ethylene-vinyl acetate copolymer, a polyvinyl acetate, a liquid crystal polymer, an ethylene-tetrafluoroethylene copolymer, an aromatic polyester, a polyvinyl fluoride, a polyvinylidene fluoride, a polyvinylidene chloride, tetrafluoroethylene, or any combination thereof.

The additional polymer can be an impact modifier, if desired. Suitable impact modifiers can be high molecular weight elastomeric materials derived from olefins, monovinyl aromatic monomers, acrylic and methacrylic acids and their ester derivatives, as well as conjugated dienes that are fully or partially hydrogenated. The elastomeric materials can be in the form of homopolymers or copolymers, including random, block, radial block, graft, and core-shell copolymers.

A specific type of impact modifier can be an elastomer-modified graft copolymer comprising (i) an elastomeric (i.e., rubbery) polymer substrate having a Tg less than about 10° C., less than about 0° C., less than about −10° C., or between about −40° C. to −80° C., and (ii) a rigid polymer grafted to the elastomeric polymer substrate. Materials suitable for use as the elastomeric phase include, for example, conjugated diene rubbers, for example polybutadiene and polyisoprene; copolymers of a conjugated diene with less than about 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_1$-$C_8$ alkyl(meth)acrylates; elastomeric copolymers of $C_1$-$C_8$ alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate.

Specific impact modifiers include styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN). Exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

The compositions described herein can comprise a UV stabilizer for dispersing UV radiation energy. The UV stabilizer does not substantially hinder or prevent cross-linking of the various components of the compositions described herein. UV stabilizers can be hydroxybenzophenones; hydroxyphenyl benzotriazoles; cyanoacrylates; oxanilides; or hydroxyphenyl triazines. Specific UV stabilizers include poly[(6-morpholino-s-triazine-2,4-diyl)[2,2,6,6-tetramethyl-4-piperidyl) imino]-hexamethylene [(2,2,6,6-tetramethyl-4-piperidyl)imino], 2-hydroxy-4-octyloxybenzophenone (Uvinul®3008); 6-tert-butyl-2-(5-chloro-2H-benzotriazole-2-yl)-4-methylphenyl (Uvinul® 3026); 2,4-di-tert-butyl-6-(5-chloro-2H-benzotriazole-2-yl)-phenol (Uvinul®3027); 2-(2H-benzotriazole-2-yl)-4,6-di-tert-pentylphenol (Uvinul®3028); 2-(2H-benzotriazole-2-yl)-4-(1,1,3,3-tetramethylbutyl)-phenol (Uvinul® 3029); 1,3-bis[(2'-cyano-3',3'-diphenylacryloyl)oxy]-2,2-bis-{[(2'-cyano-3',3'-diphenylacryloyl)oxy]methyl}-propane (Uvinul® 3030); 2-(2H-benzotriazole-2-yl)-4-methylphenol (Uvinul® 3033); 2-(2H-benzotriazole-2-yl)-4,6-bis(1-methyl-1-phenyethyl) phenol (Uvinul® 3034); ethyl-2-cyano-3,3-diphenylacrylate (Uvinul® 3035); (2-ethylhexyl)-2-cyano-3,3-diphenylacrylate (Uvinul® 3039); N,N'-bisformyl-N,N'-bis (2,2,6,6-tetramethyl-4-piperidinyl)hexamethylenediamine (Uvinul® 4050H); bis-(2,2,6,6-tetramethyl-4-pipieridyl)-sebacate (Uvinul® 4077H); bis-(1,2,2,6,6-pentamethyl-4-piperdiyl)-sebacate+methyl-(1,2,2,6,6-pentamethyl-4-piperidyl)-sebacate (Uvinul® 4092H); or combinations thereof. Other UV stabilizers include Cyasorb 5411, Cyasorb UV-3638, Uvinul 3030, and/or Tinuvin 234.

The compositions described herein can comprise heat stabilizers. Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like; phosphates such as trimethyl phosphate, or the like; or combinations thereof.

The compositions described herein can comprise an antistatic agent. Examples of monomeric antistatic agents can include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents can include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example PELESTAT® 6321 (Sanyo) or PEBAX® MH1657 (Atofina), IRGASTAT® P18 and P22 (Ciba-Geigy). Other polymeric materials can be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. Carbon fibers, carbon nanofibers, carbon nanotubes, carbon black, or a combination comprising at least one of the foregoing can be included to render the compositions described herein electrostatically dissipative.

The compositions described herein can comprise anti-drip agents. The anti-drip agent can be a fibril forming or non-fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. An exemplary TSAN can comprise about 50 wt % PTFE and about 50 wt % SAN, based on the total weight of the encapsulated fluoropolymer. The SAN can comprise, for example, about 75 wt % styrene and about 25 wt % acrylonitrile based on the total weight of the copolymer. Alternatively, the fluoropolymer can be pre-blended in some manner with a second polymer, such as for, example, an aromatic polycarbonate or SAN to form an agglomerated material for use as an anti-drip agent. Either method can be used to produce an encapsulated fluoropolymer.

The compositions described herein can comprise a radiation stabilizer, such as a gamma-radiation stabilizer. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-penten-2-ol, and 9 to decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group (—CH$_2$OH) or it can be a member of a more complex hydrocarbon group such as —CR$^{24}$HOH or —CR$^{24}_2$OH wherein R$^{24}$ is a complex or a simple hydrocarbon. Specific hydroxy methyl aromatic compounds include benzhydrol, 1,3-benzenedimethanol, benzyl alcohol, 4-benzyloxy benzyl alcohol and benzyl alcohol. 2-Methyl-2,4-pentanediol, polyethylene glycol, and polypropylene glycol are often used for gamma-radiation stabilization.

The term "pigments" means colored particles that are insoluble in the resulting compositions described herein. Exemplary pigments include titanium oxide, carbon black, carbon nanotubes, metal particles, silica, metal oxides, metal sulfides or any other mineral pigment; phthalocyanines, anthraquinones, quinacridones, dioxazines, azo pigments or any other organic pigment, natural pigments (madder, indigo, crimson, cochineal, etc.) and mixtures of pigments. The pigments can represent from about 0.05% to about 15% by weight relative to the weight of the overall composition.

The term "dye" refers to molecules that are soluble in the compositions described herein and that have the capacity of absorbing part of the visible radiation.

Exemplary fibers include glass fibers, carbon fibers, polyester fibers, polyamide fibers, aramid fibers, cellulose and nanocellulose fibers or plant fibers (linseed, hemp, sisal, bamboo, etc.) can also be envisaged.

Pigments, dyes, or fibers capable of absorbing radiation can be used to ensure the heating of an article based on the compositions described herein when heated using a radiation source such as a laser, or by the Joule effect, by induction or by microwaves. Such heating can allow the use of a process for manufacturing, transforming or recycling an article made of the compositions described herein.

Suitable fillers for the compositions described herein include: silica, clays, calcium carbonate, carbon black, kaolin, and whiskers. Other possible fillers include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as TiO$_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

In certain embodiments, the pre-dynamic cross-linked polymer can comprise a glass fiber. The pre-dynamic crosslinked polymer can comprise from about 10 wt. % to about 40 wt. %, for example, about 10, about 11, about 12, about 13, about 14, about 15, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, or about 40 wt. % of glass fiber. As an example, the glass fiber can be a fiber glass wool. The fiber glass wool can be silanized, or coated with silane, to improve dispersion within the polymer. In one example, the pre-dynamic cross-linked polymer can comprise from about 10 wt. % to about 40 wt. %, for example, about 10, about 11, about 12, about 13, about 14, about 15, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, or about 40 wt. %, of fiber glass wool. In a further example, the pre-dynamic cross-linked polymer can comprise about 15 wt. % fiber glass wool. In other embodiments, the pre-dynamic cross-linked polymer can comprise about 30 wt. % fiber glass wool.

Plasticizers, lubricants, and mold release agents can be included. Mold release agent (MRA) will allow the material to be removed quickly and effectively. Mold releases can reduce cycle times, defects, and browning of finished product. There is considerable overlap among these types of materials, which can include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate (PETS), and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like.

Various types of flame retardants can be utilized as additives. In one embodiment, the flame retardant additives include, for example, flame retardant salts such as alkali metal salts of perfluorinated $C_1$-$C_{16}$ alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like, sodium benzene sulfonate, sodium toluene sulfonate (NATS) and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. Rimar salt and KSS and NATS, alone or in combination with other flame retardants, are particularly useful in the compositions disclosed herein. In certain embodiments, the flame retardant does not contain bromine or chlorine.

The flame retardant additives can include organic compounds that include phosphorus, bromine, and/or chlorine. In certain embodiments, the flame retardant is not a bromine or chlorine containing composition. Non-brominated and non-chlorinated phosphorus-containing flame retardants can include, for example, organic phosphates and organic compounds containing phosphorus-nitrogen bonds. Exemplary di- or polyfunctional aromatic phosphorus-containing compounds include resorcinol tetraphenyl diphosphate (RDP), the bis (diphenyl) phosphate of hydroquinone, and the bis(diphenyl) phosphate of bisphenol-A, respectively, their oligomeric and polymeric counterparts, and the like. Other exemplary phosphorus-containing flame retardant additives include phosphonitrilic chloride, phosphorus ester amides, phosphoric acid amides, phosphonic acid amides, phosphinic acid amides, tris(aziridinyl) phosphine oxide, polyorganophosphazenes, and polyorganophosphonates.

Some suitable polymeric or oligomeric flame retardants include: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; 2,2-bis-(3,5-dichloro-4-hydroxyphenyl)-propane; and 2,2-bis-(3-bromo-4-hydroxyphenyl)-propane. Other flame retardants include: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

The flame retardant optionally is a non-halogen based metal salt, e.g., of a monomeric or polymeric aromatic sulfonate or mixture thereof. The metal salt is, for example, an alkali metal or alkali earth metal salt or mixed metal salt. The metals of these groups include sodium, lithium, potassium, rubidium, cesium, beryllium, magnesium, calcium, strontium, francium, and barium. Examples of flame retardants include cesium benzenesulfonate and cesium p-toluenesulfonate. See e.g., U.S. Pat. No. 3,933,734, EP 2103654, and US2010/0069543A1.

Another useful class of flame retardant is the class of cyclic siloxanes having the general formula $[(R)_2SiO]_y$ wherein R is a monovalent hydrocarbon or fluorinated hydrocarbon having from 1 to 18 carbon atoms and y is a number from 3 to 12. Examples of fluorinated hydrocarbon include, but are not limited to, 3-fluoropropyl, 3,3,3-trifluoropropyl, 5,5,5,4,4,3,3-heptafluoropentyl, fluorophenyl, difluorophenyl and trifluorotolyl. Examples of suitable cyclic siloxanes include, but are not limited to, octamethylcyclotetrasiloxane, 1,2,3,4-tetramethyl-1,2,3,4-tetravinylcyclotetrasiloxane, 1,2,3,4-tetramethyl-1,2,3,4-tetraphenylcyclotetrasiloxane, octaethylcyclotetrasiloxane, octapropylcyclotetrasiloxane, octabutylcyclotetrasiloxane, decamethylcyclopentasiloxane, dodecamethylcyclohexasiloxane, tetradecamethylcycloheptasiloxane, hexadecamethylcyclooctasiloxane, eicosamethylcyclodecasiloxane, octaphenylcyclotetrasiloxane, and the like. A particularly useful cyclic siloxane is octaphenylcyclotetrasiloxane.

Exemplary antioxidant additives include organophosphites such as tris(nonyl phenyl)phosphite, tris(2,4-di-t-butylphenyl)phosphite ("IRGAFOS 168" or "I-168"), bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate or the like; amides of beta-(3,5-di-tert-butyl-4-hydroxyphenyl)-propionic acid or the like, or combinations comprising at least one of the foregoing antioxidants.

Articles can be formed from the compositions described herein. Generally, the epoxy component, the carboxylic acid component/polyester components, and the transesterification catalyst are mixed to form the compositions described herein. The compositions described herein can then form, shaped, molded, or extruded into a desired shape. Energy is subsequently applied to cure the compositions described herein to form the dynamic cross-linked polymer compositions of the disclosure. For example, the compositions can be heated to a temperature of from about 50° C. to about 250° C. to effect curing. The cooling of the hardened compositions is usually performed by leaving the material to return to room temperature, with or without use of a cooling means. This process is advantageously performed in conditions such that the gel point is reached or exceeded by the time the cooling is completed. More specifically, sufficient energy should be applied during hardening for the gel point of the resin to be reached or exceeded.

In some embodiments, the components can be combined, extruded, and then cured during injection molding. In further embodiments, the components can be combined, then extruded, then injection molded at a relatively lower temperatures and shorter cycle time so as not to induce cross-linking, then cured to induce cross-linking and form the dynamic cross-linked polymer.

The term "article" refers to the compositions described herein being formed into a particular shape.

With thermosetting resins of the prior art, once the resin has hardened (i.e. reached or exceeded the gel point), the article can no longer be transformed or repaired or recycled. Applying a moderate temperature to such an article does not lead to any observable or measurable transformation, and the application of a very high temperature leads to degradation of this article. In contrast, articles formed from the dynamic cross-linked polymer compositions described herein, on account of their particular composition, can be transformed, repaired, or recycled by raising the temperature of the article.

From a practical point of view, this means that over a broad temperature range, the article can be deformed, with internal constraints being removed at higher temperatures. Without being bound by theory, it is believed that transesterification exchanges in the dynamic cross-linked polymer compositions are the cause of the relaxation of constraints and of the variation in viscosity at high temperatures. In terms of application, these materials can be treated at high temperatures, where a low viscosity allows injection or molding in a press. It should be noted that, contrary to the products of Diels-Alder reactions, no depolymerization is observed at high temperatures and the material conserves its crosslinked structure. This property allows the repair of two parts of an article. No mold is necessary to maintain the shape of the components during the repair process at high temperatures. Similarly, components can be transformed by application of a mechanical force to only one part of an article without the need for a mold, since the material does not flow.

Raising the temperature of the article can be performed by any known means such as heating by conduction, convection, induction, spot heating, infrared, microwave, or radiant heating. Devices for increasing the temperature of the article in order to perform the processes of described herein can include: an oven, a microwave oven, a heating resistance, a flame, an exothermic chemical reaction, a laser beam, a hot iron, a hot-air gun, an ultrasonication tank, a heating punch, etc. The temperature increase can be performed in discrete stages, with their duration adapted to the expected result.

Although the dynamic cross-linked polymer compositions do not flow during the transformation, by means of the transesterification reactions, by selecting an appropriate temperature, heating time, and cooling conditions, the new shape can be free of any residual internal constraints. The newly shaped dynamic cross-linked polymer compositions are thus not embrittled or fractured by the application of the mechanical force. Furthermore, the article will not return to its original shape. Specifically, the transesterification reactions that take place at high temperature promote a reorganization of the crosslinking points of the polymer network so as to remove any stresses caused by application of the mechanical force. A sufficient heating time makes it possible to completely cancel these stresses internal to the material that have been caused by the application of the external mechanical force. This makes it possible to obtain stable complex shapes, which are difficult or even impossible to obtain by molding, by starting with simpler elemental shapes and applying mechanical force to obtain the desired more complex final shape. Notably, it is very difficult to obtain by molding shapes resulting from twisting.

According to one variant, a process for obtaining and/or repairing an article based on a dynamic cross-linked polymer composition described herein comprises: placing in contact with each other two articles formed from a dynamic cross-linked polymer composition; and heating the two articles so as to obtain a single article. The heating temperature (T) is generally about 50° C. to about 250° C., including about 100° C. to about 200° C.

An article made of dynamic cross-linked polymer compositions as described herein can also be recycled by direct treatment of the article, for example, the broken or damaged article is repaired by means of a transformation process as described above and can thus regain its prior working function or another function. Alternatively, the article is reduced to particles by application of mechanical grinding, and the particles thus obtained can then be used to manufacture a new article.

The articles of the present are particularly suitable for use in articles where fatigue resistance is valuable. Gears are one such end use. Mechanical gears made from thermoplastic material are featured in a number of extended uses or long wear applications. For example, the gears within the power transmission of a high horsepower machine, such as an automobile, can be in the form of a wheel with teeth. Such gears are exposed to high mechanical stresses which can lead to wear and a limited life. The gears can thus experience localized overloading causing inclusions, notches, or stiffness jumps (inner notches) resulting in material damage, particularly at gear teeth. In the event of tooth wear or tooth breakage of the gear wheel, the gear wheel turns with no load and no longer serves its fundamental purpose.

In some aspects, life of a gear can be determined according to the fatigue resistance of a material from which the gear is manufactured. Thermoset and thermoplastic materials each offer unique considerations in the manufacture of gears. It is well known that thermoplastic resins generally do not possess excellent fatigue resistance, but thermoplastics offer ease of forming parts via techniques like injection molding, thermoforming, profile extrusion, etc. Thermoplastic resins also offer the ease of re-processing in that they can simply be re-melted and re-shaped. Thermoset resins typically do possess good fatigue and are resistant to distortion when under a load over an extended period of time (known as creep resistance). However, thermosets suffer from cumbersome manufacturing and are not reprocessable or recyclable. Dynamically cross-linked compositions, as disclosed herein. combine the processing advantages of thermoplastics and the resilience of thermosets. Thus, the resins can prove particularly useful in applications featuring extended use, prolonged vibration, or chronic stress, such as for example, gears.

As noted herein, the compositions of the present disclosure can endure up to an average of about 1,000,000 cycles under fatigue assessments, which is the maximum number of cycles that can be measured using conventional instrumentation. As such, about 1,000,000 cycles should be considered a minimum number of cycles that the material can withstand. In one example, unfilled dynamic cross-linked compositions disclosed herein can exhibit about 400 times greater fatigue resistance than substantially similar unfilled compositions that are not cross-linked. In further examples, which should not be construed as limiting, glass-fiber filled dynamic cross-linked compositions can exhibit about 80 times greater fatigue resistance than substantially similar unfilled compositions that are not cross-linked at a glass fiber loading of up to about 20 wt. %. At glass fiber loadings at greater than about 25 wt. %, the disclosed glass-fiber filled dynamic cross-linked compositions can exhibit about 5 times greater fatigue resistance than substantially similar glass-fiber filled compositions that are not cross-linked. These data indicate the comparable ability of the resin to withstand both a constant and a substantial mechanical stress during prolonged use and across a wide range of temperatures. Given these characteristics, the resins disclosed herein can be formed into high-fatigue, longer part-life gears for use in a number of applications.

Other examples of articles include, but are not limited to, tubing, hinges, and parts on vibrating machinery, automotive components, and pressure vessels under cyclic pressures.

The following examples are provided to illustrate the compositions, processes, and properties of the present disclosure. The examples are merely illustrative and are not intended to limit the disclosure to the materials, conditions, or process parameters set forth therein.

EXAMPLES

Materials
PBT195 (polybutylene terephthalate) (molecular weight about 60,000) (SABIC)
PBT315 (molecular weight approximately 110,000-115.000) (SABIC)
D.E.R.™ 671 (a solid epoxy resin that is the reaction product of epichlorohydrin and bisphenol A, Mw=700-1000) (Dow Benelux B.V.)
PE (1d), milled 1000 μm (Sigma-Aldrich)
Zinc(II)acetylacetonate ($H_2O$) (Acros)
ULTRANOX™ 1010 (an antioxidant) (BASF)
Demineralized water (SABIC)
Glass fiber wool (Owens Corning)

Example 1

Combinations of PBT, D.E.R. 671, and zinc(II)acetylacetonate were screened as shown in Table 1. The mount of each component is in wt. %.

TABLE 1

Combinations of PBT, D.E.R. 671, and zinc(II)acetylacetonate

| PBT Dynamic cross-linked polymer | Catalyst level screening | | | | | Cross-linker screening | | Mw Screening | | Moisture screening | |
|---|---|---|---|---|---|---|---|---|---|---|---|
| mol % epoxy + OH | 3.5 | 3.5 | 3.5 | 3.5 | 3.5 | 2.0 | 5.0 | 0 | 3.5 | 3.5 | 3.5 |
| mol % Zn | 0 | 0.025 | 0.05 | 0.1 | 0.2 | 0.1 | 0.1 | 0 | 0.1 | 0.1 | 0.1 |
| PBT Mw (PS) | 60k | 60k | 60k | 60k | 60k | 60k | 60k | 110k | 110k | 60k | 60k |
| % moisture | 0.2 | 0.2 | 0.2 | 0.2 | 0.2 | 0.2 | 0.2 | 0.2 | 0.2 | 0 | 2.2 |
| Component | | | | | | | | | | | |
| PBT 195 | 94.64 | 94.62 | 94.59 | 94.53 | 94.4 | 96.71 | 92.44 | | | | 94.53 |
| PBT 195 Dried | | | | | | | | | | 94.53 | |
| PBT 315 | | | | | | | | 99.9 | 94.53 | | |
| D.E.R. 671 | 5.26 | 5.26 | 5.26 | 5.26 | 5.26 | 3.08 | 7.35 | | 5.26 | 5.26 | 5.26 |
| Zn(acac)$_2$*H2O | | 0.028 | 0.057 | 0.113 | 0.226 | 0.116 | 0.111 | | 0.113 | 0.113 | 0.113 |
| ULTRANOX 1010 | 0.1 | 0.1 | 0.1 | 0.1 | 0.1 | 0.1 | 0.1 | 0.1 | 0.1 | 0.1 | 0.1 |
| Demin water | | | | | | | | | | | 2 |

Example 2. Formation of Pre-Dynamic Cross-Linked Polymer Compositions

The various combinations shown in Table 1 were compounded using a Werner & Pfleiderer Extruder ZSK 25 mm co-rotating twin screw extruder with the settings set forth in Table 2 using the following residence times: 2.4 minutes, 4.2 minutes, 6.8 minutes, and 8.7 minutes.

TABLE 2

| Compounding Settings | |
|---|---|
| Extruder | 25 mm ZSK Extruder |
| Die | 2 hole |
| Feed Temp | 40° C. |
| Zone 1 Temp | 70° C. |
| Zone 2 Temp | 190° C. |
| Zone 3 Temp | 240° C. |
| Zone 4 Temp | 270° C. |
| Zone 5 Temp | 270° C. |
| Zone 6 Temp | 270° C. |
| Zone 7 Temp | 270° C. |
| Zone 8 Temp | 270° C. |
| Die Temp | 270° C. |
| Screw Speed | 300 rpm |
| Throughput | 15-20 kg/hr |
| Vacuum 1 | −0.8 bar |

The compositions thus formed after compounding, that have not cross-linked so as to form a dynamic cross-linked polymer composition, readily dissolve in hexafluoro isopropanol (HFIP). Cross-linked, dynamic cross-linked polymer compositions do not dissolve in HFIP, but rather swell, likely as a result of solvent uptake within the polymer network.

Figure 9A:
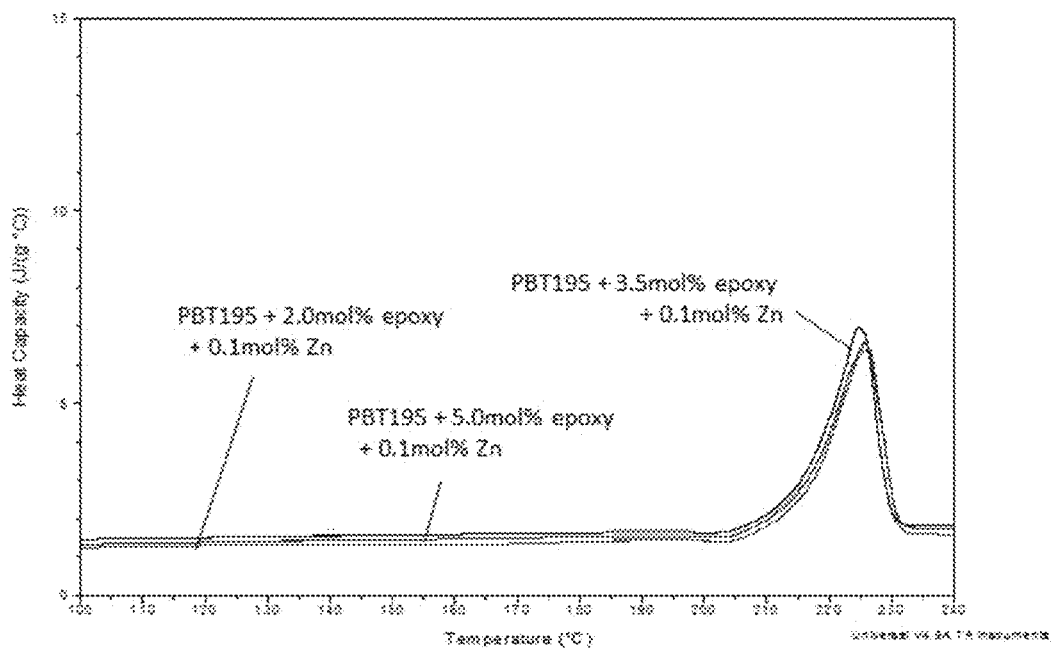
FIG. 9A depicts DSC experiments of materials pre-dynamic cross-linked polymers compositions demonstrating similar melting temperatures.
Figure 9B:
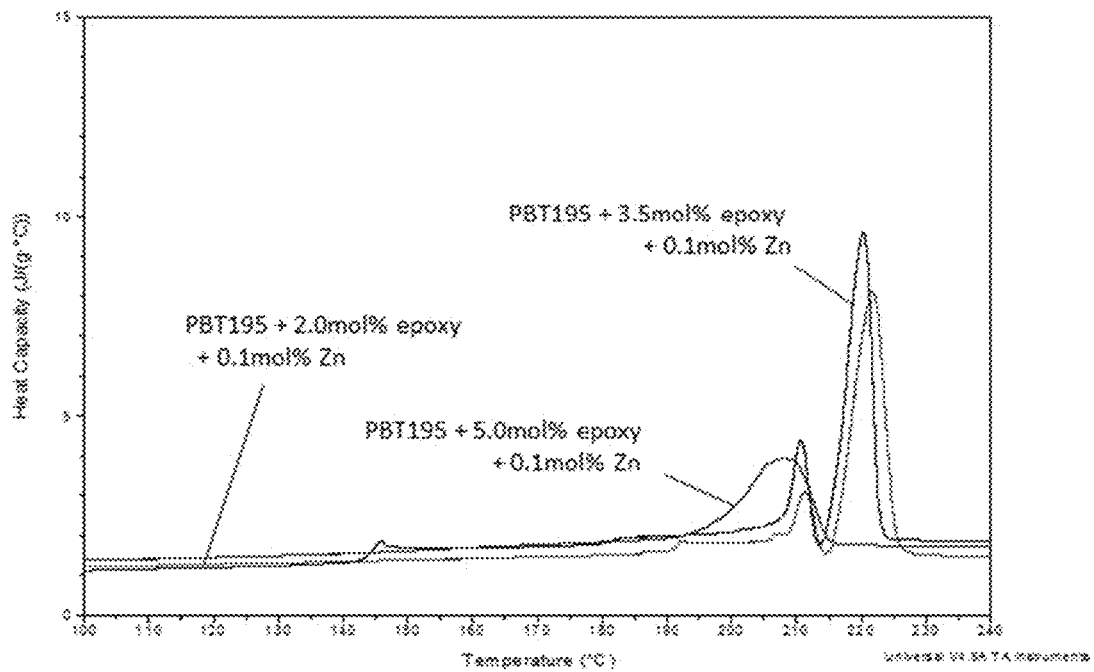
FIG. 9B depicts DSC experiments of materials compositions demonstrating a decrease in melting temperature upon an increase in cross-linking density after heating.

Differential Scanning calorimetry (DSC) scans of the compounded material are shown in FIGS. 9A and 9B.

The compounded compositions were injection molded using an Engel 90 tons, equipped with an Axxion insert mold with the settings as set forth in Table 3

TABLE 3

| Injection Molding Settings | |
|---|---|
| Molding Machine | Engel 90 tons |
| Pre-drying time | 2 hours |
| Pre-drying temp | 120° C. |
| Hopper temp | 40° C. |
| Zone 1 temp | 250° C. |
| Zone 2 temp | 260° C. |
| Zone 3 temp | 270° C. |
| Nozzle temp | 270° C. |
| Mold temp | 50° C. |
| Screw speed | 40% |
| Back pressure | 5 bar |
| Injection speed | 26-107 mm/s |
| Approx. cycle time | 26-107 s |
| Mold Type (Axxicon insert) | 2 × 4.0 mm ISO tensile |

One property change that is characteristic for dynamic cross-linked polymer formation is an increase in viscosity. On an injection molding machine, the injection pressure is an approximate measure for viscosity. During the molding runs, injection pressures were recorded at multiple residence times as shown in FIGS. 1-4.

FIG. 1 demonstrates that transesterification catalyst influences reaction kinetics. A plateau is reached at about 120 bar and 0.2 mol % of catalyst after 4.2 minutes residence time. At 0.1 mol % of catalyst, a plateau is reached after 6.8 minutes residence time. At 0.05 mol % of catalyst, a plateau would be reached after 6.8 minutes.

Figure 2:
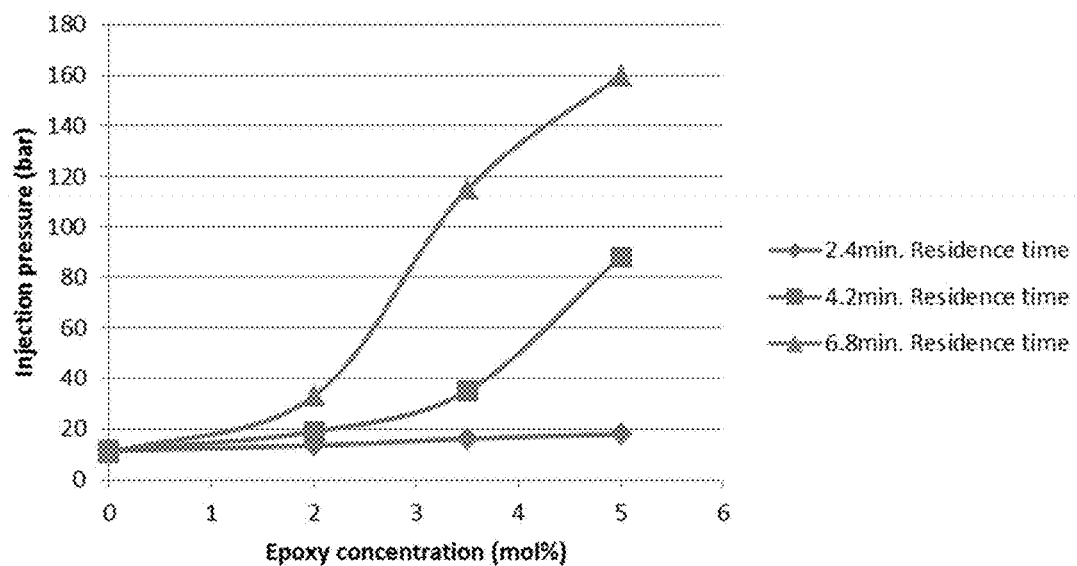
FIG. 2 depicts the effect of epoxy concentration on injection pressure using preferred embodiments of Samples 1, 4, 6, and 7 of Table 1.

FIG. 2 demonstrates that injections pressure, i.e., dynamic cross-linked polymer viscosity, increases with increasing epoxy level. For a given residence time, a higher epoxy concentration is needed to achieve the same degree of cross-linking network formation. Alternatively, for a given amount of epoxy, longer residence times provide higher conversion and cross-linking densities.

Figure 3:
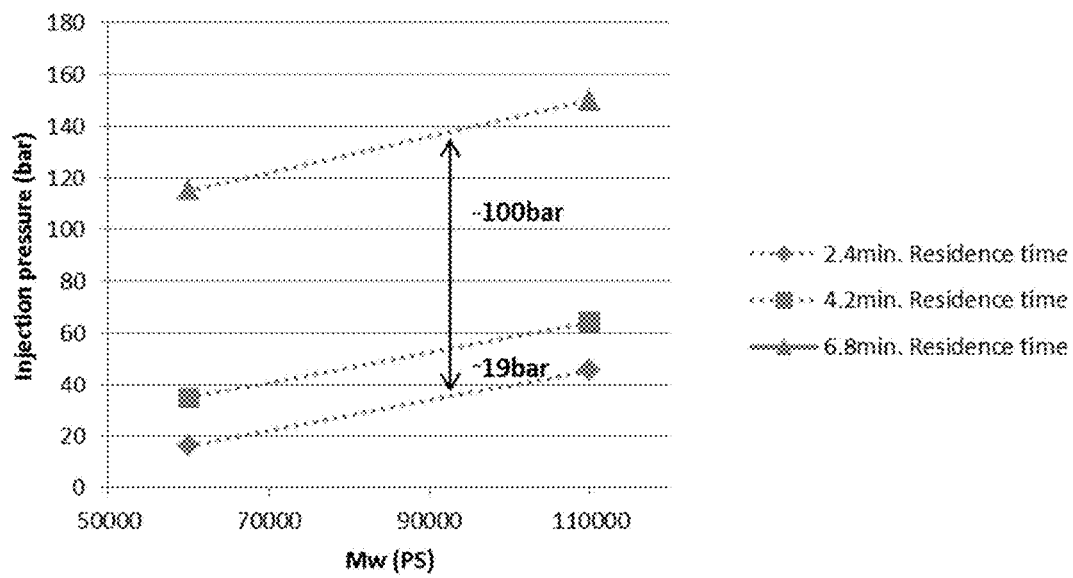
FIG. 3 depicts the effect of PBT molecular weight on injection pressure using preferred embodiments of Samples 4 and 9 of Table 1.

FIG. 3 demonstrates that injection pressure increases with increasing molecular weight of PBT. For a given residence time, a greater molecular weight results in a higher injection pressure. FIG. 3 also demonstrates that the molecular weight of PBT is correlated to the baseline injection pressure. The pressure increase, however, is determined by the residence time, which is believed to be correlated to residence time and thus, reaction time to achieve cross-linking.

Figure 4:
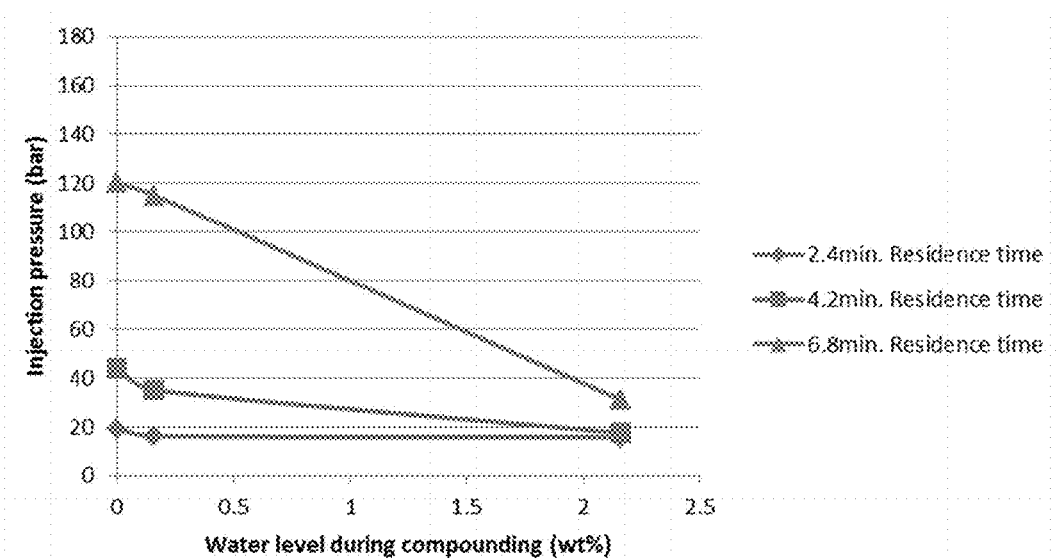
FIG. 4 depicts the effect of water/moisture concentration during compounding using preferred embodiments of Samples 4, 10, and 11 of Table 1.

FIG. 4 demonstrates that water/moisture during the compounding step negatively influences cross-link formation.

Example 3. Flex DMA

Figure 5A:
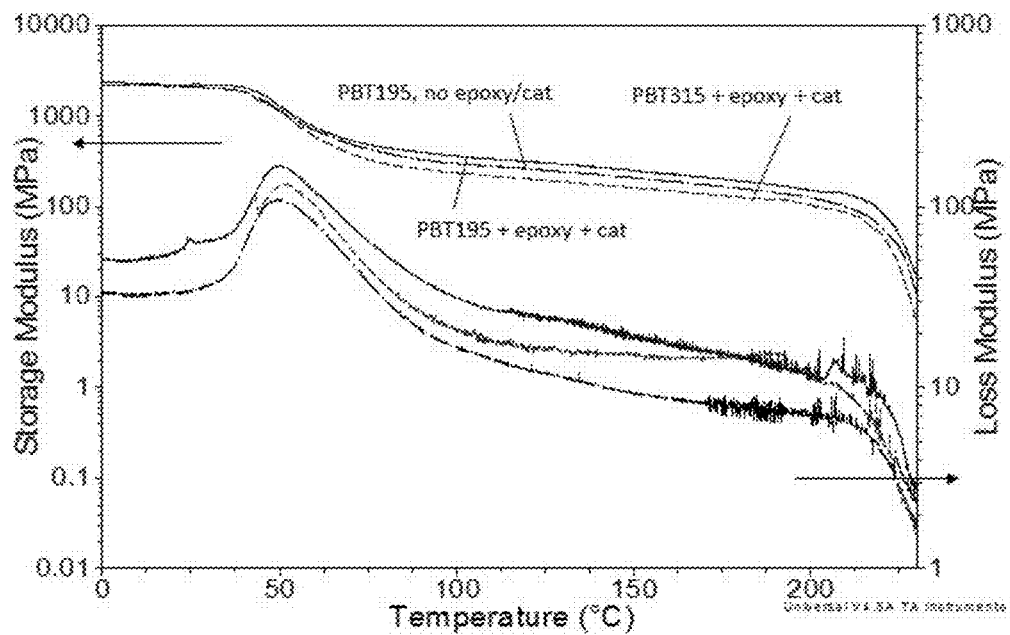
FIG. 5A depicts Flex DMA analysis of preferred embodiments [samples 1, 4, and 9] as compared to PBT, after extrusion.
Figure 5B:
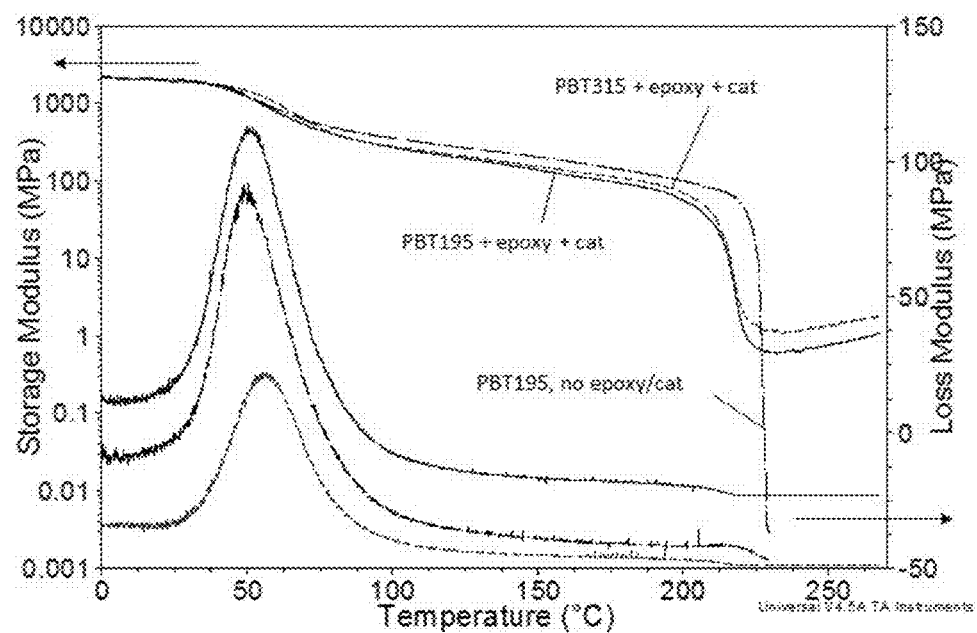
FIG. 5B depicts Flex DMA analysis of preferred embodiments [samples 1, 4, and 9] as compared to PBT, after injection molding.

A more quantitative method to determine whether a cross-linked, dynamic cross-linked polymer composition has formed is flexural dynamic mechanical analysis (Flex DMA) as shown in FIGS. 5A and 5B.

Example 4. Stress Relaxation Test

To demonstrate that dynamic cross-linked polymer compositions have dynamic cross-linking, a stress relaxation test can be performed. For this test, compounded materials were compressed at 260° C. for 10 minutes into small, disk-shaped samples with a diameter of about 4 cm and a thickness below about 1 mm Using a Ares-G2 rheometer, the disks were subjected to an initial strain of 5% at elevated temperatures and the evolution of the normalized shear modulus was followed over time.

Figure 6A:
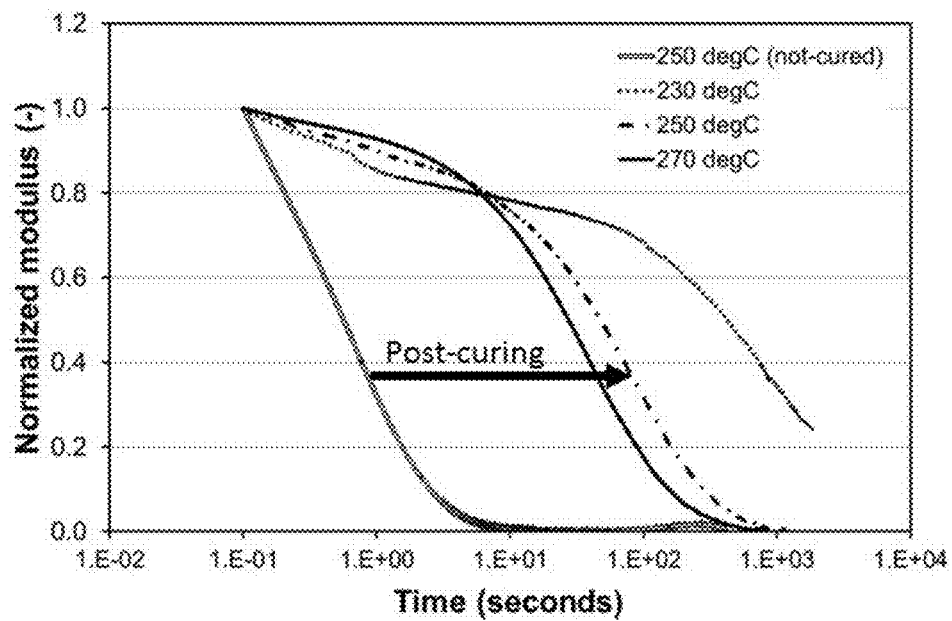
FIG. 6A depicts stress relaxation of one embodiment at 230, 250, and 270° C. of Sample 4 of Table 1.
Figure 6B:
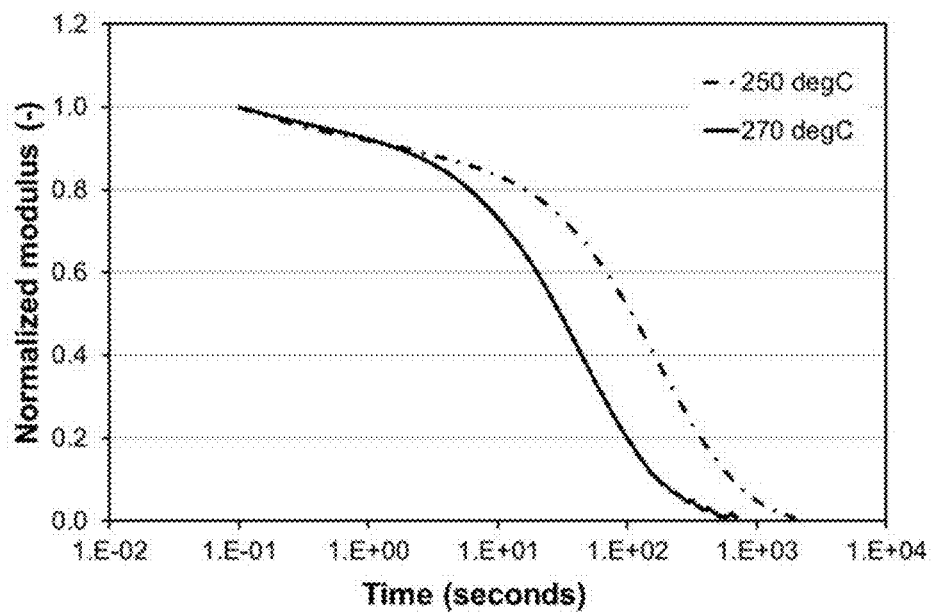
FIG. 6B depicts stress relaxation of one embodiment at 230, and 250° C. of Sample 9 of Table 1.

For a permanently cross-linked material, exhibiting no chain mobility, one would not expect any stress relation to occur. As shown in FIG. 6, the dynamic cross-linked polymer compositions described herein (i.e., fully cured, compounded compositions) do show stress relaxation indicating that the compositions exhibit the possibility of stress-relaxation due to cross-link exchange reactions, which can be characteristic of a dynamic cross-linked polymer composition. Short relaxation times of an uncured, compounded composition (see FIG. 6, light blue line), demonstrates that compounded compositions are not cross-linked after the initial compounding step only—subsequent heat treatment is needed to complete the cross-linking formation.

Example 5. Shear Modulus Test

Shear modulus releases following a single exponential decay, i.e., Maxwell behavior, according to the following equation:

$$G(t) \propto G(0) \times \exp(-t/\tau^*) \quad \text{Equation 1}$$

Figure 7:
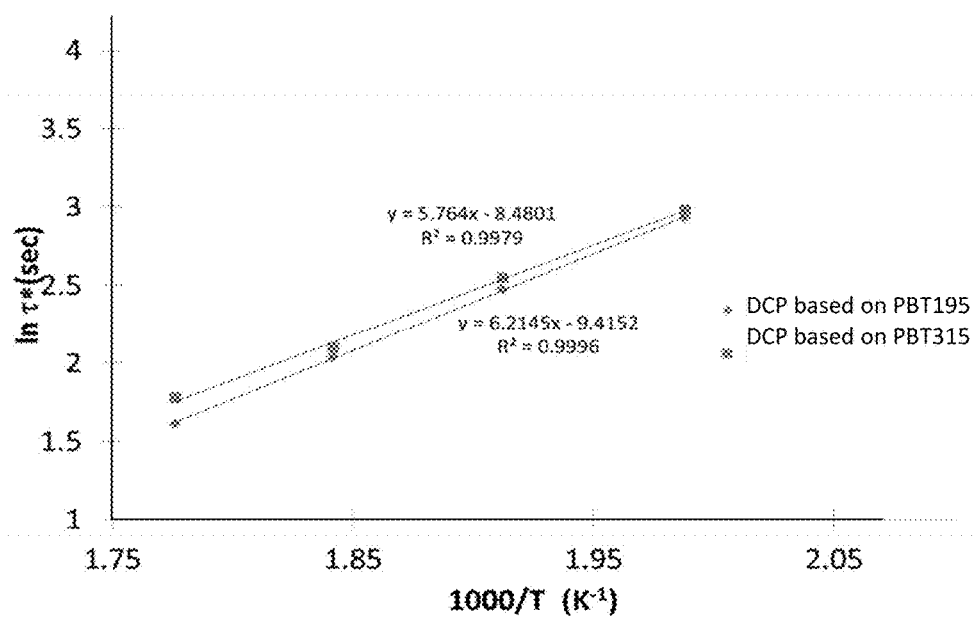
FIG. 7 depicts stress relation times for preferred embodiments of Samples 4 and 9 of Table 1.
Figure 8A:
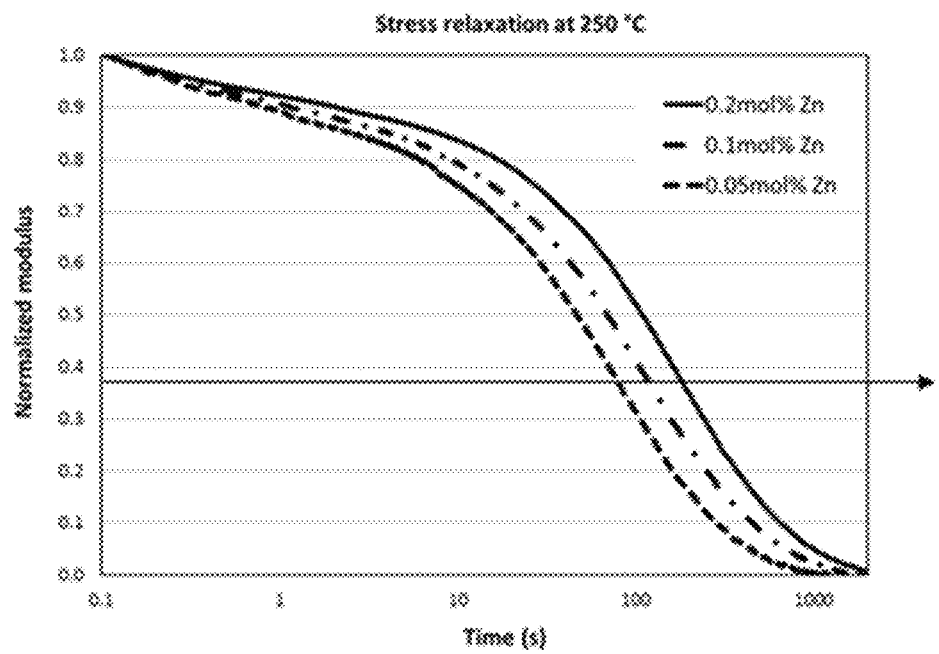
FIG. 8A depicts stress relaxation times (temperature) and FIG. 8B depicts stress relaxation times (catalyst concentration) for preferred embodiments of Samples 3, 4, and 5 of Table 1.
Figure 8B:
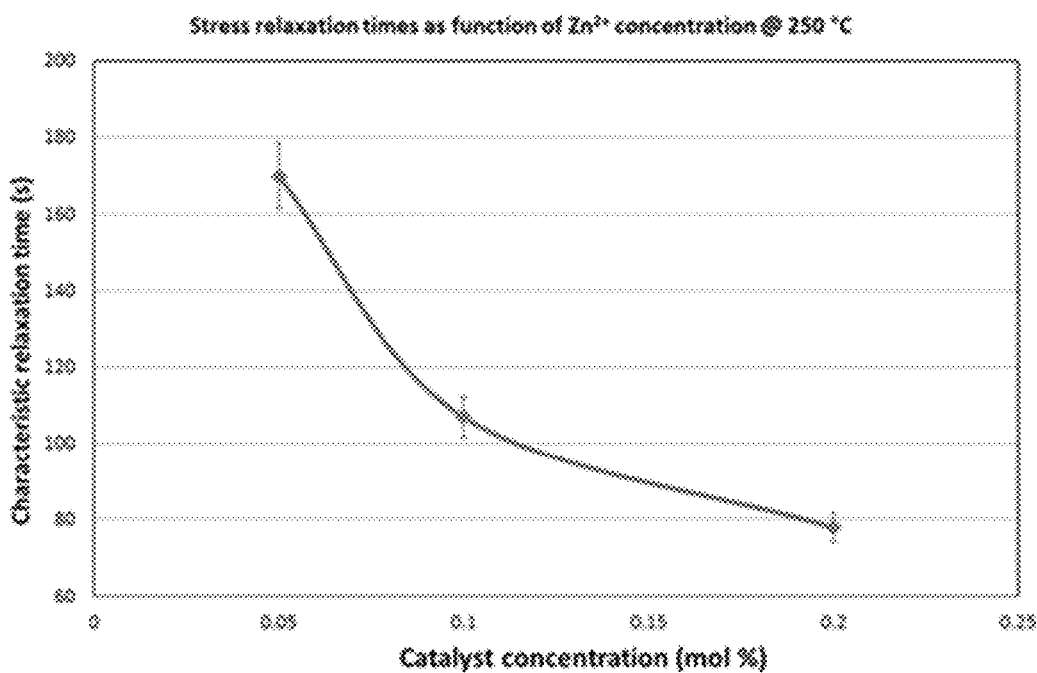

In Equation 1, $\tau^*$ is the relaxation time at which the modulus has reduced to a value of $1/e$ of its original value, i.e., $G(t)=G(0)/e \approx 0.37 \times G(0)$. This value is taken as the characteristic measure for dynamic cross-linked polymer network relaxation time at a given temperature. If the ln τ* (sec) is plotted versus 1000/T (K$^{-1}$), a linear trend is obtained as shown in FIG. 7. The linear trend can be used to predict the stress relaxation times at a particular temperature T. The stress relaxation times can depend on factors such as epoxy level, epoxy type, catalyst loading, catalyst type, polyester type. The effect of catalyst loading on stress relation times is depicted in FIG. 8.

Example 6. Mechanical Properties

As shown in Table 5, dynamic cross-linked polymer compositions have decreased Tm and Tc for this embodiment. Not all materials of the disclosure will have decreased Tm and/or Tc. The compositions also exhibit an increase in tensile modulus and a decrease in impact, which is typical of thermoset materials. The elongation at break of Sample 9 is larger than the elongation at break for Sample 8. Subsequent experiments have shown less pronounced differences in elongation at break when comparing dynamic cross-linked polymer compositions with reference PBT.

TABLE 1A

Combinations of PBT, D.E.R. 671, PE, zinc(II)acetylacetonate

| | Post curing screening | | | | |
|---|---|---|---|---|---|
| | 1 | 2 | 3 | 4 | 5 |
| mol % epoxy | 0 | 2 | 3 | 3 | 3 |
| mol % Zn | 0 | 0.20 | 0.05 | 0.35 | 0.60 |
| PBT Mw (PS) | 60k | 60k | 60k | 60k | 60k |
| Components (wt %) | | | | | |
| PBT 195 | 99.1 | 95.6 | 94.3 | 94.0 | 93.7 |
| D.E.R. 671 | 0 | 3.1 | 4.6 | 4.5 | 4.5 |
| Zn(acac)$_2$*H2O | 0 | 0.23 | 0.06 | 0.40 | 0.68 |
| ULTRANOX 1010 | 0.1 | 0.1 | 0.1 | 0.1 | 0.1 |
| PE (ld), milled | 1 | 1 | 1 | 1 | 1 |

The various combinations shown in Table 1A were compounded using a Werner & Pfleiderer Extruder ZSK 25 mm co-rotating twin screw extruder with the settings set forth in Table 6.

TABLE 5

Mechanical Properties of Preferred Dynamic Cross-Linked polymer Compositions

| PBT Dynamic cross-linked polymer | Catalyst level screening | | | | | Cross-linker screening | | Mw Screening | | Moisture screening | |
|---|---|---|---|---|---|---|---|---|---|---|---|
| | 1 | 2 | 3 | 4 | 5 | 6 | 7 | 8 | 9 | 10 | 11 |
| mol % epoxy + OH | 3.5 | 3.5 | 3.5 | 3.5 | 3.5 | 2.0 | 5.0 | 0 | 3.5 | 3.5 | 3.5 |
| mol % Zn | 0 | 0.025 | 0.05 | 0.1 | 0.2 | 0.1 | 0.1 | 0 | 0.1 | 0.1 | 0.1 |
| PBT Mw (PS) | 60k | 60k | 60k | 60k | 60k | 60k | 60k | 110k | 110k | 60k | 60k |
| % moisture | 0.2 | 0.2 | 0.2 | 0.2 | 0.2 | 0.2 | 0.2 | 0.2 | 0.2 | 0 | 2.2 |
| Tg and Tm by DSC (° C.) | | | | | | | | | | | |
| $T_m$ first heating | 225.3 | 224.3 | 225.4 | 224.7 | 224.6 | 225.5 | 224.3 | 225.2 | 223.8 | 226.4 | 225.3 |
| $T_{m1}$ second heating | 212.5 | 212.0 | 211.6 | 210.6 | 209.5 | 211.2 | 209.0 | 213.7 | 211.7 | 211.7 | 211.4 |
| $T_{m2}$ second heating | 221.9 | 221.8 | 221.1 | 220.0 | 219.3 | 221.7 | 218.4 | 222.3 | 220.3 | 220.3 | 221.3 |
| $T_c$ | 198.6 | 197.2 | 197.3 | 196.3 | 195.9 | 195.9 | 190.4 | 195.8 | 192.9 | 196.6 | 197.1 |
| Shrinkage on T-bar flow direction (%) | | | | | | | | | | | |
| 2.4 min. res. time | 2.41 | 2.35 | 2.29 | 2.29 | 2.71 | 2.00 | 2.00 | 2.47 | 2.29 | 2.41 | 2.29 |
| 4.2 min. res. time | 2.00 | 1.94 | 2.00 | 2.29 | 2.94 | 2.47 | 2.71 | 1.88 | 2.47 | 1.94 | 2.18 |
| 6.8 min. res. time | 1.59 | 1.53 | 1.94 | 2.00 | 2.35 | 2.06 | 2.12 | 1.76 | 2.41 | 2.29 | 2.71 |
| 8.7 min. res. time | | | | | 2.12 | | | | | | |
| Tensile modulus (MPa) | | | | | | | | | | | |
| 2.4 min. res. time | 2767 | 2736 | 2752 | 2741 | 2830 | 2643 | 2747 | 2469 | 2600 | 2723 | 2741 |
| 4.2 min. res. time | 2759 | 2717 | 2733 | 2847 | 3079 | 2615 | 2930 | 2478 | 2744 | 2840 | 2714 |
| 6.8 min. res. time | 2762 | 2699 | 2876 | 2951 | 2987 | 2777 | 2872 | 2441 | 2995 | 3013 | 2763 |
| Tensile nominal strain at break (%) | | | | | | | | | | | |
| 2.4 min. res. time | 2.7 | 2.9 | 2.9 | 2.3 | 2.8 | 2.8 | 1.7 | 9.4 | 88.8 | 2.3 | 2.7 |
| 4.2 min. res. time | 2.5 | 2.8 | 3.0 | 3.5 | 1.5 | 3.2 | 1.3 | 7.0 | 19.0 | 2.6 | 2.3 |
| 6.8 min. res. time | 1.8 | 2.3 | 2.2 | 2.5 | 1.7 | 5.2 | 1.6 | 7.6 | 6.9 | 1.8 | 2.9 |
| Izod Unnotched Impact (kJ/m$^2$, NB = No Break) | | | | | | | | | | | |
| 2.4 min. res. time | | | | 42.2 | 39.8 | | | NB | NB | | |
| 4.2 min. res. time | | | | 37.1 | 8.0 | | | NB | NB | | |
| 6.8 min. res. time | | | | | 5.1 | | | NB | 53.3 | | |

Example 7. Formation of Pre-Dynamic Cross-Linked Polymer Compositions

Combinations of PBT, D.E.R. 671, and zinc(II)acetylacetonate were screened to evaluate the effect of residence time and temperature. Table 1A provides the formulations. Reference Sample 1 does not contain zinc(II)acetylacetonate or DER™ 671 (epoxy).

TABLE 6

| Compounding settings | | |
|---|---|---|
| Extruder | Units | Parameter |
| Die | — | 2 hole |
| Feed Temp | ° C. | 40 |
| Zone 1 Temp | ° C. | 70 |

TABLE 6-continued

Compounding settings

| Extruder | Units | Parameter |
|---|---|---|
| Zone 2 Temp | °C. | 220 |
| Zone 3 Temp | °C. | 240 |
| Zone 4 Temp | °C. | 270 |
| Zone 5 Temp | °C. | 260 |
| Zone 6 Temp | °C. | 260 |
| Die Temp | °C. | 260 |
| Screw speed | rpm | 450 |
| Throughput | kg/hr | 31 |
| Vacuum 1 | bar | −0.8 (full vacuum) |

After compounding, the pre-dynamic cross-linked compositions obtained were injection molded using an Engel 45 tons, equipped with an Axxicon insert mold with the settings as provided in Table 7.

TABLE 7

Molding settings

| Molding Machine | Units | Parameter |
|---|---|---|
| Pre-drying time | Hour | 2 |
| Pre-drying temp | °C. | 120 |
| Hopper temp | °C. | 40 |
| Zone 1 temp | °C. | 230 |
| Zone 2 temp | °C. | 240 |
| Zone 3 temp | °C. | 250 |
| Nozzle temp | °C. | 250 |
| Mold temp | °C. | 60 |
| Screw speed | % | 80 |
| Back pressure | bar | 5 |
| Injection speed | mm/s | 40 |
| Approx. cycle time | s | 1.8 |
| Mold Type (Axxicon insert) | — | 2 × 4.0 mm ISO tensile |

The molding temperatures were kept relatively low (less than or equal to 250° C.) and the molding times were kept relatively short (less than 2 seconds (s)) to prevent cross-linking within the mold. Table 8 shows the injection pressure measured post curing screening. The values show that there is no significant increase in injection pressure which would suggest pressure that affects the cross-linking formation compared to reference sample 1, containing no cross-linking agent.

TABLE 8

Injection Pressures

| | Post Curing Samples | | | | |
|---|---|---|---|---|---|
| UNITS in mol % | 1 | 2 | 3 | 4 | 5 |
| mol % epoxy | 0 | 2 | 3 | 3 | 3 |
| mol % Zn | 0 | 0.20 | 0.05 | 0.35 | 0.60 |
| PBT Mw (PS) | 60k | 60k | 60k | 60k | 60k |
| Injection pressure (Bar) | 8.5 | 8.7 | 9.0 | 8.3 | 7.8 |

Figure 10A:
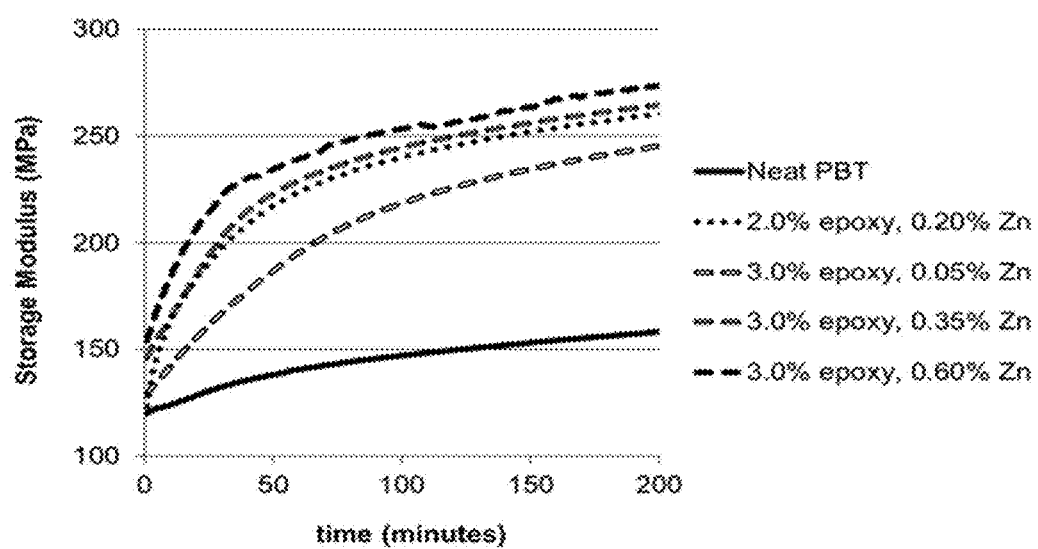
FIG. 10 depicts the storage modulus as a function of time for one embodiment of the disclosure.

To form the dynamic cross-linked compositions, the molded parts were heated at a constant temperature of 200° C. in a dynamic mechanic analyzer (DMA). The analyzer measures the modulus of the samples. Results are presented in FIG. 10. As shown, a significant increase in modulus compared to the reference sample (Neat PBT) is apparent. The increase in storage modulus can be attributed to the formation of cross-linking which makes the polymer sample more rigid.

Figure 11:
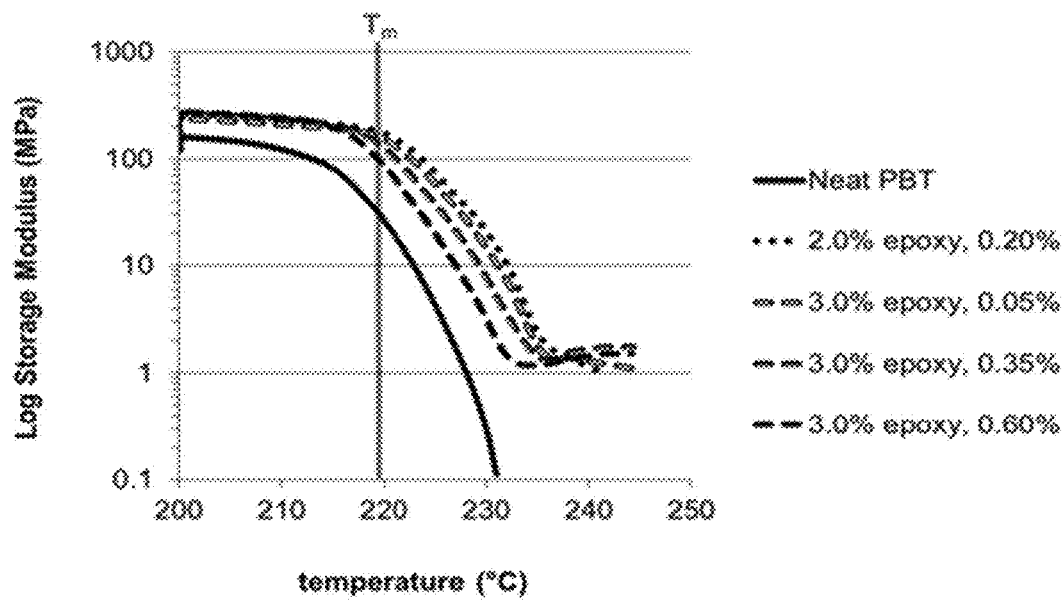
FIG. 11 depicts storage modulus as a function of temperature for injection molded pre-dynamic cross-linked compositions of the disclosure with varying epoxide loadings as compared to a control composition.

After curing at 200° C. for four hours, the samples were gradually heated to 250° C. FIG. 11 shows the DMA results in temperature scan mode of the post cured injection molded pre-dynamic cross-linked compositions. The samples appear to lose modulus upon passing the melting point of the compositions. However, they still exhibit a residual modulus of greater than 1 MPa. These results indicate that the cross-linked network is formed as a result of post curing (heating to 250° C.). Thus, the pre-dynamic cross-linked compositions can be processed into parts without forming cross-links and then subsequently post cured by heat exposure to form a dynamic cross-linked composition product.

Example 8

Combinations of PBT, D.E.R. 671, zinc(II)acetylacetonate, and glass fiber wool were screened to assess mechanicals properties and fatigue properties of molded part. Table 9 provides the formulations of samples 6-11. Reference sample 6 contains no zinc(II)acetylacetonate, DER 671, or glass fiber.

TABLE 9

Combinations of PBT, D.E.R. 671, PE, zinc(II)acetylacetonate, and glass fiber

| Component (wt %) | 6 | 7 | 8 | 9 | 10 | 11 |
|---|---|---|---|---|---|---|
| PBT315, milled | 98.9 | 93.7 | 83.9 | 78.7 | 68.9 | 63.7 |
| DER 671 Epoxy Resin | 0.0 | 5.0 | 0.0 | 5.0 | 0.0 | 5.0 |
| PE (ld), milled 1000 μm | 1 | 1 | 1 | 1 | 1 | 1 |
| Antioxidant 1010 | 0.1 | 0.1 | 0.1 | 0.1 | 0.1 | 0.1 |
| Zinc (II) Acetylacetonate | 0.0 | 0.2 | 0.0 | 0.2 | 0.0 | 0.2 |
| Glass fiber wool | 0.0 | 0.0 | 15 | 15 | 30 | 30 |

Example 9. Formation of Pre-Dynamic Cross-Linked Polymer Compositions

The various combinations shown in Table 9 were compounded using a Werner & Pfleiderer Extruder ZSK 25 mm co-rotating twin screw extruder with the settings shown in Table 10.

TABLE 10

Compounding Settings

| Extruder | Units | Parameter |
|---|---|---|
| Die | — | 2 hole |
| Feed Temp | °C. | 50 |
| Zone 1 Temp | °C. | 150 |
| Zone 2 Temp | °C. | 240 |
| Zone 3 Temp | °C. | 260 |
| Zone 4 Temp | °C. | 250 |
| Zone 5 Temp | °C. | 240 |
| Zone 6 Temp | °C. | 240 |
| Zone 7 Temp | °C. | 240 |
| Zone 8 Temp | °C. | 240 |
| Zone 9 Temp | °C. | 250 |
| Die Temp | °C. | 260 |
| Screw Speed | rpm | 300 |
| Throughput | kg/h | 25 |
| Torque | % | 70-80 |
| Vacuum | bar | max |

The compositions formed after compounding were injection molded using an Engle tons molding machine equipped with an Axxicon insert mold with the settings shown in Table 11.

TABLE 11

| Profile ID | Unit | Parameter |
|---|---|---|
| Molding type | — | E 45 |
| Pre-drying time | hour | 2 |
| Pre-drying temp | ° C. | 110 |
| Hopper Temp | ° C. | 40 |
| Zone 1 Temp | ° C. | 240 |
| Zone 2 Temp | ° C. | 250 |
| Zone 3 Temp | ° C. | 260 |
| Nozzle Temp | ° C. | 255 |
| Mold Temp | ° C. | 60 |
| Screw Speed | rpm | 100 |
| Back Pressure | bar | 5 |
| Injection Time | s | 2-3 |
| Holding Time | s | 10 |
| Cooling Time | s | 17 |
| Cycle Time | s | 30-32 | and DCN materials, the selected loading was 70% of the highest stress at break value for each pair of equivalent reference/DCN samples. The highest value for stress at break of each sample series was selected to maximize the chance of failure of at least one sample. Failure of at least one sample was necessary allow discrimination between fatigue resistance of equivalent samples with and without DCN. The value reported for fatigue is the number of cycles at which the tensile bar fails by either breaking or necking. The higher value for the number of cycles, the higher the polymer's resistance to fatigue. Improvement of fatigue is also shown with respect to both absolute and relative improvements which are defined using averages according to the following equations:

$$\text{Absolute improvement} = \text{AVG}_{DCN}/\text{AVG}_{Reference}$$

$$\text{Relative Improvement (\%)} = [1-(\text{AVG}_{DCN}/\text{AVG}_{Reference})] \times 100$$

The values are presented in Table 12 for samples 6 through 11 at various amounts of glass fiber filler loadings.

TABLE 12

Fatigue at room temperature and frequency of 5 Hz

| | DCN system | | | | | |
|---|---|---|---|---|---|---|
| | DCN | | DCN | | DCN | |
| | Glass loading | | | | | |
| | unfilled | unfilled | 15% GF | 15% GF | 30% GF | 30% GF |
| | 6 | 7 | 8 | 9 | 10 | 11 |
| Amplitude | 0.819 | 0.819 | 1.228 | 1.228 | 1.636 | 1.636 |
| Load | 1.0 kN | 1.0 kN | 1.5 kN | 1.5 kN | 2.0 kN | 2.0 kN |
| Cycles 1 at 5 Hz | 2691 | 1000000 | 2844 | 230080 | 1557 | 4595 |
| Cycles 2 at 5 Hz | 2598 | 1000000 | 2388 | 274235 | 1493 | 6965 |
| Cycles 3 at 5 Hz | 2518 | 1000000 | 2328 | 120528 | 1415 | 4838 |
| AVG | 2602 | 1000000 | 2520 | 208281 | 1488 | 5466 |
| Absolute improvement | | 384 times (×) | | 83× | | 3.7× |
| Relative improvement | | 99.7% | | 99% | | 73% |

Example 10. Fatigue Assessment

Fatigue was measured using tensile bars made of the dynamically crosslinked composition formed after heating at a constant temperature of 200° C., maintained at 200° C. for four hours and then gradually heating to 250° C. The process choice is the post curing method as that process results in the best quality tensile bars exhibiting the least in molded stress.

The mechanical testing procedure was similar to ASTM D3479/D3479M—12 "Standard Test Method for Tension-Tension Fatigue of Polymer Matrix Composite Materials" where equal force, amplitude, and frequency (5 Hz) settings are used for both the DCN resin as well as the reference material. The load force ranged from 1 to 2 kiloNewtons (kN). The actual force and amplitude was chosen based on filler level with force and amplitude increasing as the filler loading was increased. The actual loading setting that is used in the fatigues experiments is calculated based on the values of stress at break of each sample. To allow for a fair comparison between reference (non-cross-linked polymer)

As shown, fatigue is more than 380 times greater when the pre-dynamic cross-linked composition is converted into a DCN composition by adding epoxide cross-linking additional catalyst. At low glass fiber loadings, the effect is less, but still significant in that fatigue is more than 80 times greater with 15% glass fiber loading (Samples 8 and 9).

Knitline strength of the samples was also observed in relation to the weldability of the DCN compositions. Weldability indicates how amenable the compositions are to welding. Results are presented in Table 13. Tensile bars were injection molded with a knitline in the center of the tensile bar. The determination was X-flow and was performed by injection molding the formulations into a double-gated tensile bar mold. Typically, the weakest point in these samples is the knitline as demonstrated by tensile and fatigue tests on molded bars of formulations 6K, 8K, and 10K, where K denotes knitline sample. Cured and non-cured samples were evaluated. However, the knitline strength improves greatly after the post-curing step (samples 7K, 9K, and 11K) which are the DCN cured samples. Absolute and relative improvements are also presented.

TABLE 13

Knitline strength of cured and non-cured compositions.

| | Knitline | | Knitline | | Knitline | |
|---|---|---|---|---|---|---|
| | | DCN (cured) | | DCN (cured) | | DCN (cured) |
| | | | Glass loading | | | |
| | unfilled 6K | unfilled 7K | 15% 8K | 15% 9K | 30% 10K | 30% 11K |
| Amplitude | 0.819 | 0.819 | 1.064 | 1.064 | 1.064 | 1.064 |
| Load | 1 kN | 1 kN | 1.3 kN | 1.3 kN | 1.3 kN | 1.3 kN |
| Cycle 1, 5 Hz | 2134 | 362842 | 429 | 9235 | 427 | 5310 |
| Cycle 2, 5 Hz | 1268 | 241483 | 216 | 2824 | 523 | 1811 |
| Cycle 3, 5 Hz | 1919 | 235200 | 162 | 4693 | 508 | 3112 |
| AVG | 1774 | 279842 | 269 | 5584 | 486 | 3411 |
| Absolute Improvement | | 157× | | 21× | | 7.0× |
| Relative improvement | | 99.4% | | 95% | | 86% |

As shown in Table 13, fatigue resistance of DCN-based knitline samples increased up to 170 times compared to the non-cured reference sample. Visually difference in failure mode was also observed for DCN samples. Sample 7K broke above the original knitline, whereas the standard PBT sample 6K (not cross-linked) broke at the knitline as would be expected. The glass filled samples 8K, 9K, 10K, and 11K all broke at the original knitline, which is attributed to the orientation of glass fibers based on flow which is not altered during the post-curing step. As such, it appeared that the knitline was no longer the weakest point in the DCN samples. During post-curing, new cross-links were formed across the knitline interface because of transesterification reactions. The cross-linking transesterification reactions thus strengthened the knitline and would be unique to the dynamically cross-linked polymer networks. Classical thermosets have permanent cross-linking that could not be exchanged, and thus, there would be no weldability possible in the materials once the cross-linked network formed completely. Classical thermoplastics can have benefits of such a heat treatment step like post-curing (this would be called annealing in the case of non-reactive thermoplastic resin). However, because the viscosity of the materials drops quite drastically just above Tg/Tm, the operational window for annealing of weldline in thermoplastics—without loss of shape stability—is very limited to can be only a few (tens) of degrees. For DCN compositions, the operational window can be several tens or even hundred degrees above Tg/Tm.

Annealing of neat PBT knitline samples 6K, 8K, and 10K were also performed. Compared to the samples that were not annealed, the fatigue resistance of glass-filled materials is improved. It is well known that semi-crystalline samples become stronger after annealing because of crystal perfectioning. The samples still however break at their original knitline. Unfilled PBT performed even worse after annealing as shown in Sample 6K.

Example 11

The components set forth in the following Table 14 were mixed and compounded on a Werner-Pfleiderer ZSK25 twin-screw extruder (diameter=25 mm) at a melt temperature of 270° C. and a throughput of 18 kg/hour. Glass fibers were fed separately to the blend using a side feeder. The pre-DCN compounded pellets were dried 3 hours at 110° C. and injection molded on an Engel 45 injection molding machine (melt temperature=270° C., mold temperature=60° C.). Long (120 seconds) and short (10 seconds) cooling times were used to control the residence times of the sample (342 or 70 seconds, respectively) to form the desired sample specimen. It should be noted here that short residence times during injection molding prevented formation of a complete polymer network during processing. The injection-molded samples were then post-cured in an oven for 1 hour at 170° C., followed by 4 hours at 190° C. to complete the network formation.

All samples were tested for mechanical properties (tensile, flexural, impact), thermal properties (DMA and HDT) as well as submitted to rheological characterization to determine network formation kinetics (time sweep rheology at constant strain) and network dynamics (stress relaxation experiment of fully cured network), as reported before.

TABLE 14

| Item (Wt %) | | Ex1 | Ex2 | Ex3 | Ex4 | Ex5 | CE6 | CE7 |
|---|---|---|---|---|---|---|---|---|
| PET resin | | 85.6 | 85.6 | 85.65 | 85.63 | 85.665 | 85.7 | 88.9 |
| DER 671 epoxy | | 3.2 | 3.2 | 3.20 | 3.2 | 3.2 | 3.2 | |
| Zn(acac)$_2$•H$_2$O | | 0.1 | | | | | | |
| Zn(lactate)$_2$•H$_2$O | | | 0.1 | 0.05 | | | | |
| ZnO | | | | | 0.07 | 0.035 | | |
| Irganox 1010 | | 0.1 | 0.1 | 0.1 | 0.1 | 0.1 | 0.1 | 0.1 |
| PE (polyethylene) | | 1 | 1 | 1 | 1 | 1 | 1 | 1 |
| PBT glass fibers (10 μm) | | 10 | 10 | 10 | 10 | 10 | 10 | 10 |
| | | 100 | 100 | 100 | 100 | 100 | 100 | 100 |
| Tensile modulus (MPa) | ISO 527 | 5679 | 5415 | 5481 | 5436 | 5394 | 5347 | 5305 |
| Stress at break (MPa) | | 77.1 | 59.6 | 76.0 | 85.5 | 88.1 | 82.1 | 89.3 |
| Strain at break (%) | | 1.7 | 1.3 | 1.7 | 2.0 | 2.1 | 1.9 | 1.9 |
| Flexural modulus (MPa) | ISO 178 | 4870 | 4567 | 4731 | 4736 | 4799 | 4720 | 4608 |

TABLE 14-continued

| Item (Wt %) | | Ex1 | Ex2 | Ex3 | Ex4 | Ex5 | CE6 | CE7 |
|---|---|---|---|---|---|---|---|---|
| Flexural stress (MPa) | | 107.1 | 97.8 | 110.3 | 107.6 | 102.6 | 99.1 | 113.5 |
| Impact energy (Izod, unnotched) (kJ/m$^2$) | ISO 180 | 11.3 | 9.1 | 12.3 | 14.2 | 11.9 | 13.9 | 13.7 |
| HDT (° C.) | ISO 75AF | 219 | 221 | 220 | 221 | 217 | 220 | 219 |

The results of tensile, flexural and (Izod unnotched) impact testing are included in Table 14. In contrast to the previously disclosed samples, there is no marked difference in mechanical properties between the cross-linked DCN based on PET. samples Ex1-Ex5 and the not cross-linked comparative example formulation CE7. This is most likely due to the glass fibers are dominating the mechanical properties of these materials, rather than the cross-links, as in the case of PBT-based samples.

Figure 12:
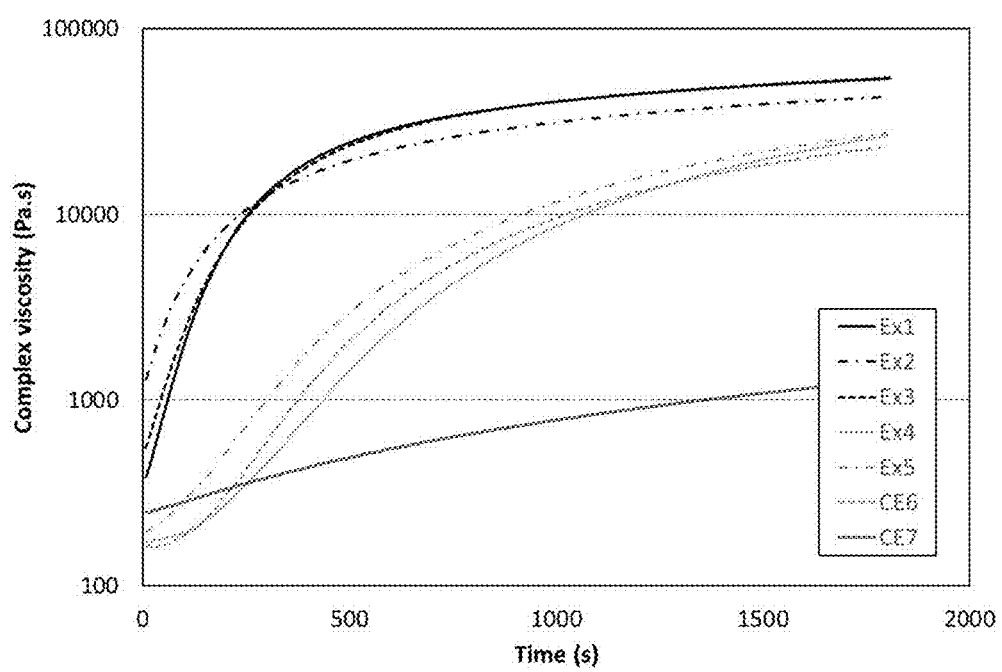
FIG. 12 depicts time-sweep rheology experiments according to Example 11.

In a first test, the samples were subjected to a time sweep rheology experiment to monitor the increase of complex viscosity with time (which is a measure for the extent of network formation). The time sweep experiment was carried out at 270° C. and with a constant strain of 5%. The results are plotted in FIG. 12 and indicate that samples Ex1-Ex5 form a polymer network over time. Network formation is fastest for samples Ex1-Ex3 with Zn(acac)$_2$ and Zn(lactate)$_2$ as catalysts; samples Ex4-Ex5 with ZnO are much slower (similar to what was observed for PBT-based DCNs). Notably, there is a rise in complex viscosity of the comparative sample CE6 which contains the epoxy cross-linker, but no catalyst. Moreover, the kinetics seem to be equally fast as for the (slower) ZnO catalyst.

Figure 13:
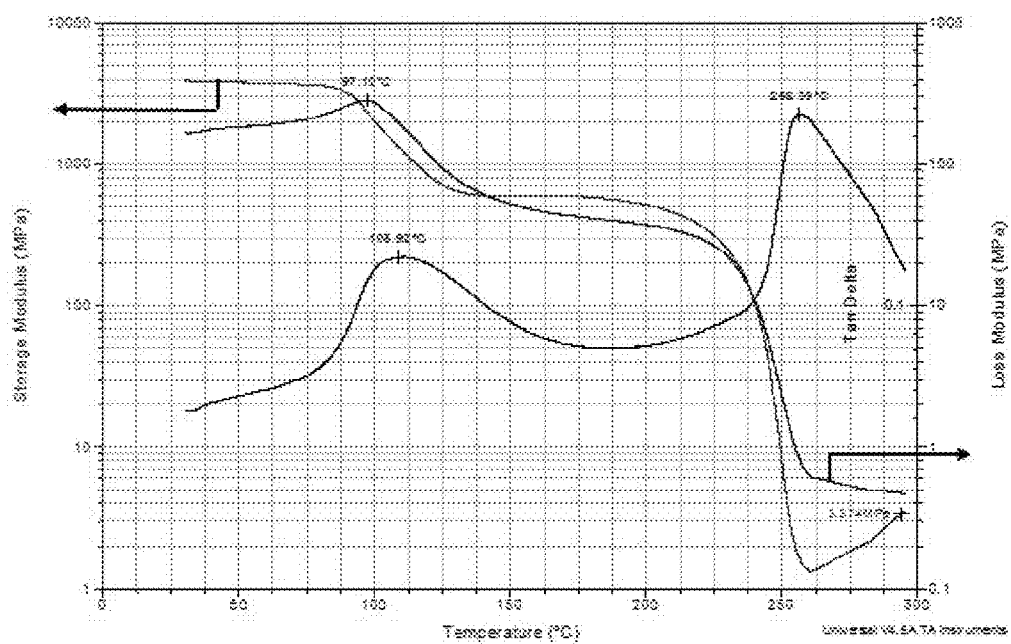
FIG. 13 depicts DMA experiments according to Example 11.

Comparative sample CE7, which lacks cross-linker, does not show any significant increase in complex viscosity. DMA measurements were performed on sample Ex1 (FIG. 13) where a plateau value was observed for the loss and storage modulus above the melting point of PET (around 250° C.) indicating the absence of melt flow. Although the absolute values are slightly higher due to the glass fibers, the storage modulus drops by about three orders of magnitude compared to room temperature, which is similar to what was observed for unfilled PBT-based DCNs.

Figure 14:
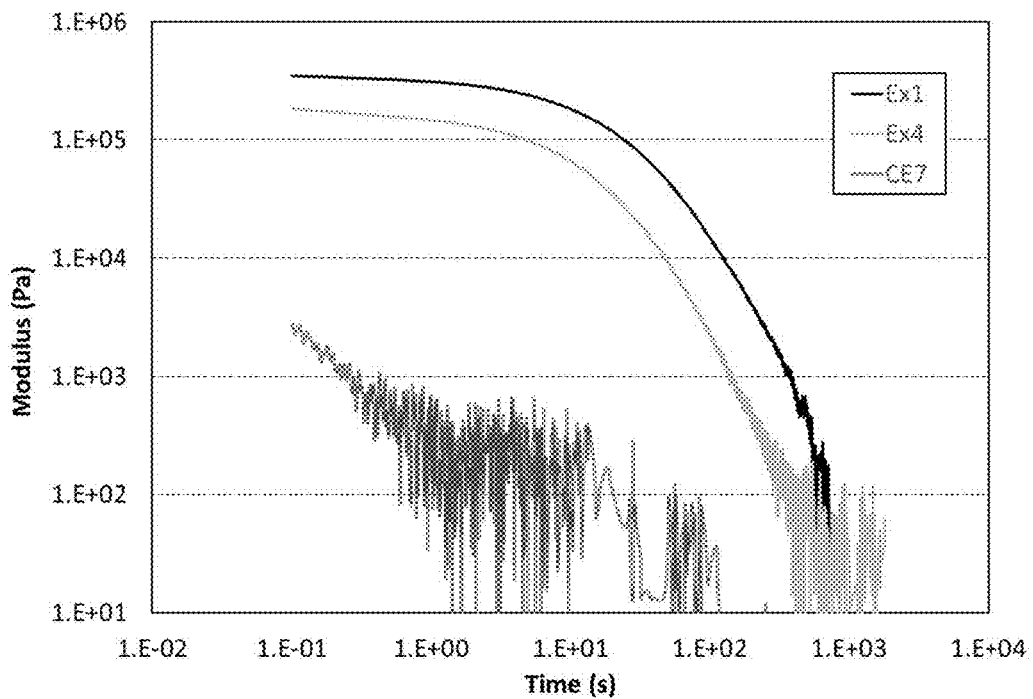
FIG. 14 depicts stress relaxation experiments according to Example 11.

Stress relaxation experiments were performed on the fully cured samples to verify that the formed PET networks are indeed dynamic networks. In these experiments, the shear modulus of sample was monitored over time to see relaxation of stresses that were initially imposed on the sample. DCNs would show a gradual decrease of the modulus, whereas conventional thermoset networks cannot relax stresses. The stress relaxation experiments were performed at 270° C. and a constant strain of 5%. The results in FIG. 14 confirm that the formed networks from samples Ex1-Ex5 and CE6 are dynamic networks. For the sake of clarity, only the stress relaxation curves for samples Ex1 and Ex4 are shown; the curves for samples Ex2-Ex3 and Ex5 and CE6 are almost overlapping to those of Ex1 or Ex4, respectively.

Unless indicated otherwise, all standard tests are conducted in accordance with the version in effect in 2014.

The methods and articles are further illustrated by the following embodiments, which are non-limiting.

Embodiment 1

A method of forming a pre-dynamic cross-linked polymer composition comprising: combining in an extruder an epoxy-containing component; a polyester component; and a transesterification catalyst; at a temperature of up to about 320° C. for about 7 minutes or less.

Embodiment 2

The method of Embodiment 1, wherein the temperature is between about 40° C. and about 320° C.

Embodiment 3

The method of any one of the preceding Embodiments, wherein the combining occurs for less than about 2.5 minutes.

Embodiment 4

The method of any one of the preceding Embodiments, wherein the combining occurs under an inert atmosphere.

Embodiment 5

The method of any one of the preceding Embodiments, wherein the epoxy-containing component is bisphenol A diglycidyl ether.

Embodiment 6

The method of any one of the preceding Embodiments, wherein the polyester component is a polyalkylene terephthalate, preferably a polybutylene terephthalate.

The method of any one of the preceding Embodiments, wherein the transesterification catalyst is zinc(II)acetylacetonate.

Embodiment 7

The method of any one of the preceding Embodiments, wherein the transesterification catalyst is present in an amount of about 0.025 mol % to about 25 mol %, based on the number of ester moieties in the polyester component.

Embodiment 8

The method of any one of the preceding Embodiments, wherein the water content of the pre-dynamic cross-linked polymer composition is less than about 2.5 wt. %, based on the weight of the pre-dynamic cross-linked polymer composition.

Embodiment 9

The method of any of the preceding Embodiments, wherein the pre-dynamic cross-linked polymer composition further comprises a pigment, a dye, a filler, a plasticizer, a fiber, a flame retardant, an antioxidant, a lubricant, wood, glass, metal, an ultraviolet agent, an anti-static agent, an anti-microbial agent, or a combination thereof.

Embodiment 10

The method of any of the preceding Embodiments, wherein the pre-dynamic cross-linked polymer composition further comprises glass fibers.

Embodiment 11

A pre-dynamic cross-linked polymer composition prepared according to any of the preceding Embodiments.

Embodiment 12

A molded article prepared from a pre-dynamic cross-linked polymer composition prepared according to any one of Embodiments 1 to 12.

Embodiment 13

A method of forming an injection molded article comprising: melting a pre-dynamic cross-linked polymer composition according to Embodiment 13; and injecting the melted pre-dynamic cross-linked polymer composition into an injection mold to form the injection molded article.

Embodiment 14

The method of Embodiment 14, wherein the injection mold is heated to a temperature of up to about 50° C.

Embodiment 15

The method of any one of Embodiments 14 or 15, further comprising curing the injection molded article.

Embodiment 16

An article formed according to the method of any one of Embodiments 14 to 16.

Embodiment 17

A method of forming an article comprising a dynamic cross-linked polymer composition: heating a pre-dynamic cross-linked polymer composition according to Embodiment 12; and subjecting the heated pre-dynamic cross-linked polymer composition to a compression molding process, a profile extrusion process, or a blow molding process to form the article comprising the dynamic cross-linked polymer composition.

Embodiment 18

An article formed according to the method of Embodiment 18.

Embodiment 19

The article of any one of Embodiments 13, 17, or 19, wherein the article is a gear.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:

1. A method of forming an injection molded article, comprising:
    forming a pre-dynamic cross-linked polymer composition by combining in an extruder an epoxy-containing component, polyester component, and a transesterification catalyst at a temperature of up to about 320° C. for about 7 minutes or less;
    melting the pre-dynamic cross-linked polymer composition; and
    injecting the melted pre-dynamic cross-linked polymer composition into an injection mold to form the injection molded article.

2. The method of claim 1, wherein the temperature is between about 40° C. and about 320° C.

3. The method of claim 1, wherein the combining occurs for less than about 2.5 minutes.

4. The method of claim 1, wherein the combining occurs under an inert atmosphere.

5. The method of claim 1, wherein the epoxy-containing component is bisphenol A diglycidyl ether.

6. The method of claim 1, wherein the polyester component is a polyalkylene terephthalate.

7. The method of claim 1, wherein the transesterification catalyst is zinc(II)acetylacetonate.

8. The method of claim 1, wherein the transesterification catalyst is present in an amount of about 0.025 mol % to about 25 mol %, based on the number of ester moieties in the polyester component.

9. The method of claim 1, wherein the water content of the pre-dynamic cross-linked polymer composition is less than about 2.5 wt. %, based on the weight of the pre-dynamic cross-linked polymer composition.

10. The method of claim 1, wherein the pre-dynamic cross-linked polymer composition further comprises a pigment, a dye, a filler, a plasticizer, a fiber, a flame retardant, an antioxidant, a lubricant, wood, glass, metal, an ultraviolet agent, an anti-static agent, an anti-microbial agent, or a combination thereof.

11. The method of claim 1, wherein the pre-dynamic cross-linked polymer composition further comprises glass fibers.

12. The method of claim 1, wherein the injection mold is heated to a temperature of up to about 50° C.

13. The method of claim 1, further comprising curing the injection molded article.

14. The method of claim 1, wherein the injection molded article is a gear.

15. A method of forming an article comprising a dynamic cross-linked polymer composition, comprising:
    forming a pre-dynamic cross-linked polymer composition by combining in an extruder an epoxy-containing component, a polyester component, and a transesterification catalyst at a temperature of up to about 320° C. for about 7 minutes or less;
    heating the pre-dynamic cross-linked polymer composition; and subjecting the heated pre-dynamic cross-linked polymer composition to a compression molding process, a profile extrusion process, or a blow molding process to form the article comprising the dynamic cross-linked polymer composition.

16. The method of claim 15, wherein the temperature is between about 40° C. and about 320° C.

17. The method of claim 15, wherein the combining occurs for less than about 2.5 minutes.

18. The method of claim 15, wherein the combining occurs under an inert atmosphere.

19. The method of claim 15, wherein the epoxy-containing component is bisphenol A diglycidyl ether.

20. The method of claim 15, wherein the polyester component is a polyalkylene terephthalate.

21. The method of claim 15, wherein the transesterification catalyst is zinc(II)acetylacetonate.

22. The method of claim 15, wherein the transesterification catalyst is present in an amount of about 0.025 mol % to about 25 mol %, based on the number of ester moieties in the polyester component.

23. The method of claim 15, wherein the water content of the pre-dynamic cross-linked polymer composition is less than about 2.5 wt. %, based on the weight of the pre-dynamic cross-linked polymer composition.

24. The method of claim 15, wherein the pre-dynamic cross-linked polymer composition further comprises a pigment, a dye, a filler, a plasticizer, a fiber, a flame retardant, an antioxidant, a lubricant, wood, glass, metal, an ultraviolet agent, an anti-static agent, an anti-microbial agent, or a combination thereof.

25. The method of claim 15, wherein the pre-dynamic cross-linked polymer composition further comprises glass fibers.

26. The method of claim 15, wherein the article is a gear.

* * * * *